(12) United States Patent
Vendas Da Costa et al.

(10) Patent No.: US 11,455,740 B2
(45) Date of Patent: Sep. 27, 2022

(54) SYSTEM AND METHOD OF OPERATION FOR REMOTELY OPERATED VEHICLES FOR SIMULTANEOUS LOCALIZATION AND MAPPING

(71) Applicant: Abyssal S.A., Matosinhos (PT)

(72) Inventors: Pedro Miguel Vendas Da Costa, Oporto (PT); Manuel Alberto Parente Da Silva, Maia (PT)

(73) Assignee: ABYSSAL S.A., Matosinhos (PT)

( * ) Notice: Subject to any disclaimer, the term of this patent is extended or adjusted under 35 U.S.C. 154(b) by 0 days.

(21) Appl. No.: 17/266,014

(22) PCT Filed: Aug. 8, 2018

(86) PCT No.: PCT/IB2018/055979
§ 371 (c)(1),
(2) Date: Feb. 4, 2021

(87) PCT Pub. No.: WO2020/030951
PCT Pub. Date: Feb. 13, 2020

(65) Prior Publication Data
US 2021/0304430 A1    Sep. 30, 2021

(51) Int. Cl.
*G06T 7/579*    (2017.01)
*G06T 7/174*    (2017.01)
(Continued)

(52) U.S. Cl.
CPC .............. *G06T 7/579* (2017.01); *G06T 5/002* (2013.01); *G06T 7/174* (2017.01); *G06T 7/70* (2017.01);
(Continued)

(58) Field of Classification Search
None
See application file for complete search history.

(56) References Cited

U.S. PATENT DOCUMENTS 10,007,269 B1    6/2018    Gray
10,394,327 B2 *  8/2019    Chizeck .................. G06F 3/016
(Continued)

FOREIGN PATENT DOCUMENTS

| EP | 0674977 A1 | 10/1995 |
| FR | 2949167 A1 | 2/2011 |
| WO | 2013/068821 A2 | 5/2013 |

OTHER PUBLICATIONS

International Search Report and Written Opinion received for PCT Patent Application No. PCT/US2018/055979, dated Mar. 7, 2019; 13 pages.
(Continued)

*Primary Examiner* — Delomia L Gilliard
(74) *Attorney, Agent, or Firm* — Baker Botts L.L.P.

(57) ABSTRACT

The present invention provides systems and methods for simultaneous localization and mapping from video with adversarial shape prior learning in real-time. For example, an unsupervised direct and dense SLAM may learn a geometry prior from data. Given a video sequence, a depth map of a target frame, as well as the target frame and the camera motions between the target frame and all the remaining frames may be output. Further, by fusing a camera motion estimate with a positional sensor's output, positional drift and the need for loop closure can be avoided.

20 Claims, 16 Drawing Sheets

(51) Int. Cl.
    *G06T 7/70*     (2017.01)
    *G06T 5/00*     (2006.01)

(52) U.S. Cl.
    CPC ............... *G06T 2207/10016* (2013.01); *G06T 2207/10028* (2013.01); *G06T 2207/20081* (2013.01); *G06T 2207/20084* (2013.01); *G06T 2207/30252* (2013.01)

(56) References Cited

U.S. PATENT DOCUMENTS

| | | | |
|---|---|---|---|
| 2014/0316611 | A1 | 10/2014 | Parente Da Silva |
| 2019/0147220 | A1 | 5/2019 | Mcconnac et al. |
| 2020/0041276 | A1* | 2/2020 | Chakravarty .......... G06N 3/088 |
| 2020/0292817 | A1* | 9/2020 | Jones ................ G02B 27/0093 |
| 2021/0304430 | A1* | 9/2021 | Vendas Da Costa ..... G06T 7/70 |
| 2022/0005332 | A1* | 1/2022 | Metzler ................. G06V 20/52 |

OTHER PUBLICATIONS

International Search Report and Written Opinion received for PCT Patent Application No. PCT/US2018/055976, dated Feb. 22, 2019; 11 pages.

International Search Report and Written Opinion received for PCT Patent Application No. PCT/US2018/055977, dated Apr. 9, 2019; 21 pages.

International Search Report and Written Opinion received for PCT Patent Application No. PCT/US2018/055978, dated Feb. 22, 2019; 12 pages.

Kalwa, J. et al., "The MORPH Project: Actual Results," Oceans 2015—Genova, IEEE, May 18, 2015, 8 pages.

Eckstein, Sebastian et al., "Towards Innovative Approaches of Team-Oriented Mission Planning and Mission Languages for Multiple Unmanned Marine Vehicles in Event-Driven Mission," MTS/IEEE Oceans, Bergen, Jun. 2013, 8 pages.

Vijayanarasimhan, Sudheendra, et al., "SfM-Net: Learning of Structure & Motion from Video," retrieved from the internet on Feb. 21, 2019, URL: https://arxiv.org/pdf/1704.07804.pdf, 5 pages.

Bruno, Fabio, et al., "Virtual and Augmented Reality Tools to Improve the Exploitation of Underwater Archaeological Sites by Diver and Non-diver Tourists," International Conference on Simulation, Modeling, and Programming for Autonomous Robots, SIMPAR 2010, Oct. 31, 2016, 12 pages.

Marchand, Eric, et al., "Pose Estimation for Augmented Reality: A Hands-On Survey," IEEE Transactions on Visualization and Computer Graphics, vol. 22, No. 12, Dec. 1, 2016, 19 pages.

Vlahakis, Vassilio et al., "Archeoguide: an augmented reality guide for archaeological sites," IEEE Computer Graphics and Applications, vol. 22, No. 5, Sep. 1, 2002, 9 pages.

Sharma, Ojaswa et al., "Navigation in AR based on digital replicas," The Visual Computer, Springer, Berlin, DE, vol. 34, No. 6, May 2, 2018, 12 pages.

Reitmayr, Gerhard et al., "Going out," Mixed and Augmented Reality, ISMAR 2006. IEEE/ACM International Symposium ON, IEEE, PI, Oct. 22, 2006 , 10 pages.

Tzafestas, Costas S., "Virtual and Mixed Reality in Telerobotics: A Survey," Industrial Robotics—Programming, Simulation and Application, Jan. 1, 2006, 34 pages.

O'Byrne, Michael et al., "Semantic Segmentation of Underwater Imagery Using Deep Networks Training in Synthetic Imagery," Journal of Marine Science and Engineering, vol. 6, No. 3, Aug. 3, 2018, 15 pages.

Choi, S.K., et al., "Distributed Virtual Environment Collaborative Simulator for Underwater Robots," Proceedings of the 2000 IEEE/RSJ International Conference on Intelligent Robots and Systems, Oct. 2000, 6 pages.

Baraldi et al., "LAMV: Learning to align and match videos with kemelized temporal layers," Facebook AI Research, Jun. 19, 2018, URL: https://ai.facebook.com/results/?content_types%5B0%5D=publication&page=10&years%5B0%5D=2018 (Year 2018).

\* cited by examiner

SYSTEM AND METHOD OF OPERATION FOR REMOTELY OPERATED VEHICLES FOR SIMULTANEOUS LOCALIZATION AND MAPPING

CROSS-REFERENCE TO RELATED APPLICATIONS

This application is a U.S. National Stage Application of International Application No. PCT/IB2018/055979 filed Aug. 8, 2018, which designates the United States.

The disclosures of published patent documents referenced in this application are hereby incorporated in their entireties by reference into this application in order to more fully describe the state of the art to which this invention pertains.

The present invention relates to a system of operation for remotely operated vehicles ("ROV"), and methods for its use. In particular, the present invention provides a system and method of operation for ROVs using simultaneous localization and mapping.

BACKGROUND OF THE INVENTION

Exploration of the last frontier on earth, the sea, is largely driven by the continuing demand for energy resources. Because humans are not able to endure the pressures induced at the depths at which energy reconnaissance occurs, we have become increasingly reliant upon technology such as autonomous vehicles and ROV technology. The future of the exploration of the oceans is only as fast, reliable and safe as the available technology. Thus, new innovations in exploration are needed.

SUMMARY OF THE INVENTION

The embodiments disclosed herein provide systems and methods related to unsupervised Simultaneous Localization and Mapping (SLAM) from video with adversarial shape prior learning. SLAM is the problem of simultaneously estimating the structure of a scene and the motion of the camera from a sequence of images (e.g., a video). These methods have been traditionally developed for robotic applications and are now fundamental parts of new technologies such as augmented reality and autonomous vehicles.

There are two main approaches to the SLAM problem: direct and indirect methods. Indirect methods start by pre-processing the input images in order to generate an intermediate representation. This pre-processing step is usually performed by feature extraction and matching across frames. Then, the intermediate representation is used to compute the structure of the scene and motion of the camera. Direct methods, on the other hand, use the intensity values of the images by optimizing a photometric error.

SLAM methods can also output sparse or dense reconstructions of the scene. Sparse methods can reconstruct a set of independent points while dense methods can estimate the structure of all the pixels in an image.

In the embodiments disclosed here, systems and methods provide an unsupervised direct and dense SLAM that learns a geometry prior from data. Given a video sequence, the systems and methods may output a depth map of a target frame and the camera motions between the target and all the remaining frames. Moreover, by fusing a camera motion estimate with a positional sensor's output, positional drift and the need for loop closure can be avoided.

Embodiments of the invention may include, as examples and without limitation, the following technical solutions and improvements:

Novel Architecture: a novel Convolutional Neural Network (CNN) architecture, which may be referred to as SLAM-Net, may be used that is more accurate in structure estimation than existing architectures.

Learnt Shape Prior: Generative Adversarial Networks (GANs) may be used to learn the shape prior from data, instead of using hand-craft shape priors.

No Assumptions: modules may learn to segment the regions of the image that break the assumptions made by the photometric error, without any supervision.

Stable Training: a novel curriculum learning setting may be used to help the model to converge to a good solution.

Unsupervised: modules can be trained in a fully unsupervised fashion.

Single Frame Depth Estimation: modules can be used to estimate the depth map of a single image.

Real-time: modules can run in real-time.

BRIEF DESCRIPTION OF THE DRAWINGS

The aforementioned and other aspects, features and advantages can be better understood from the following detailed description with reference to the accompanying drawings wherein.

DETAILED DESCRIPTION OF THE INVENTION

Figure 1A:
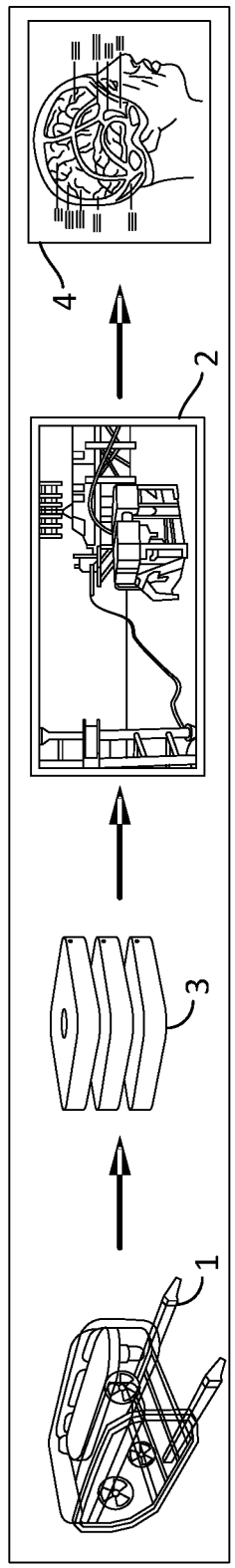
FIG. 1A shows a diagrammatic view of a system, according to some embodiments.

The invention provides a system for operating a remotely operated vehicle (ROV) using simultaneous localization and mapping (SLAM) comprising:
a) a ROV with (i) a video camera operable to output real video and (ii) a positional sensor operable to output position data;
b) a SLAM engine comprising:
   i. a video dataset operable to store video data and real images coming from the ROV;
   ii. a depth dataset operable to store depth maps;

iii. a 3D model dataset operable to store 3D model data of a scene where an ROV may operate;
iv. a depth map simulator with access to the 3D model dataset and a set of camera parameters, wherein the depth map simulator is operable to synthesize a depth map for storage in the depth dataset;
v. a model's weights dataset operable to store weights of the SLAM engine;
vi. a SLAM trainer module with access to the video dataset and the depth dataset, wherein the SLAM trainer module is operable to run a SLAM-Net architecture; and
c) an application module communicatively coupled to the ROV and operable to receive the real video, the position data, and the model's weights dataset, wherein the application module is operable to smooth the position data, reconstruct the scene, and display the scene on a graphical user interface.

The SLAM-Net architecture may further have one or more of the following additional features, which may be combined with one another or any other feature described herein unless clearly mutually exclusive.

The SLAM-NET architecture may further comprise a set of input frames.

The SLAM-Net architecture may further comprise a depth map, a set of camera motions represented as transformation matrices, segmentation masks, and a plurality of convolutional neural networks.

The SLAM-Net architecture may further comprise at least one skip connection.

The system may further comprise:
a) a set of unlabeled videos stored in the video dataset;
b) wherein the SLAM engine receives the set of unlabeled videos from the video dataset and minimizes photometric error between a target frame and a set of remaining frames.

The SLAM engine may segment a plurality of pixels from the video data.

The SLAM engine may be operable to perform bilinear sampling by linearly interpolating an intensity value of four discrete pixel neighbors of a homogeneous pixel coordinate projection.

The SLAM engine may track at least one point across a plurality of frames.

The SLAM engine may use a GAN to learn a depth prior to improve a depth map.

The GAN may comprise a generator network operable to output at least one fake example and a discriminator network operable to distinguish between at least one fake example and a real example.

The SLAM engine may synthesize depth maps using a 3D model depiction of a real scene.

The invention provides a system for undersea exploration comprising:
a) a networked operating system comprising a computer and computer executable software comprising a simultaneous localization and mapping (SLAM) engine;
b) a ROV communicatively coupled with the operating system and comprising (i) a video camera operable to output real video and (ii) a positional sensor operable to output position data;
c) wherein the SLAM engine comprises:
i. a video dataset operable to store video data and real images coming from the ROV;
ii. a depth dataset operable to store depth maps;
iii. a 3D model dataset operable to store 3D model data of a scene where an ROV may operate;
iv. a depth map simulator with access to the 3D model dataset and a set of camera parameters, wherein the depth map simulator is operable to synthesize a depth map for storage in the depth dataset;
v. a model's weights dataset operable to store weights of the SLAM engine;
vi. a SLAM trainer module with access to the video dataset and the depth dataset, wherein the SLAM trainer module is operable to run a SLAM-Net architecture; and
d) an application module communicatively coupled to the ROV and operable to receive the real video, the position data, and the model's weights dataset, wherein the application module is operable to smooth the position data and reconstruct the scene; and
e) a navigation interface configured to display the scene, the navigation interface comprising at least one networked monitor.

The SLAM-Net architecture may further have one or more of the following additional features, which may be combined with one another or any other feature described herein unless clearly mutually exclusive.

The SLAM-Net architecture may further comprise a set of input frames.

The SLAM-Net architecture may further comprise a depth map, a set of camera motions represented as transformation matrices, segmentation masks, and a plurality of convolutional neural networks.

The system may further comprise:
a) a set of unlabeled videos stored in the video dataset;
b) wherein the SLAM engine receives the set of unlabeled videos from the video dataset and minimizes photometric error between a target frame and a set of remaining frames.

The SLAM engine may segment a plurality of pixels from the video data.

The SLAM engine may be operable to perform bilinear sampling by linearly interpolating an intensity value of four discrete pixel neighbors of a homogeneous pixel coordinate projection.

The SLAM engine may track at least one point across a plurality of frames.

The SLAM engine may use a GAN to learn a depth prior to improve a depth map; and the GAN comprises a generator network operable to output at least one fake example and a discriminator network operable to distinguish between the at least one fake example and a real example.

In a method according to the invention, simultaneous localization and mapping (SLAM) for remotely operated vehicles (ROV) includes:
a) obtaining video data, real images, and position data from an ROV;
b) obtaining depth maps;
c) smoothing the position data using a SLAM-Net convolutional neural network (CNN) architecture and outputting smoothed position data;
d) reconstructing a 3D scene based at least in part on the smoothed position data; and
e) displaying the 3D scene on a graphical user interface.

The invention also provides a computer program product, stored on a computer-readable medium, for implementing any method according to invention as described herein.

As mentioned supra, various features and functionalities are discussed herein by way of examples and embodiments in a context of ROV navigation and machine learning for use in undersea exploration. In describing such examples and exemplary embodiments, specific terminology is employed for the sake of clarity. However, this disclosure is not intended to be limited to the examples and exemplary embodiments discussed herein, nor to the specific terminology utilized in such discussions, and it is to be understood that each specific element includes all technical equivalents that operate in a similar manner.

Definitions

The following terms are defined as follows:

3D elements; 3D objects—Data defining three-dimensional shapes, obtained by modeling sonar-derived input or user-determined input.

Abstraction; layer of abstraction—A characteristic of executable software, wherein differing data formats are standardized into a common format such that components are made compatible.

Data engine—A collection of modules, according to an embodiment of this invention, which is responsible for at least the acquisition, storing and reporting of data collected over the course of a ROV mission.

Fail state—A state, defined by a user or by a standard, wherein the functionality of the system, according to some embodiments of the invention, has decreased to an unacceptable level.

Luminance threshold—A system-determined value of RGB (Red, Green, Blue) pixel color intensity which defines a visible but transparent state for the images depicted by a digital image output device.

Module—A combination of at least one computer processor, computer memory and custom software that performs one or more defined functions.

Navigation engine—A collection of modules, according to some embodiments of this invention, which is responsible for making the Navigation Interface interactive, and for producing data for displaying on the Navigation Interface.

Positioned; geopositioned; tagged—Having a location defined by the Global Positioning System of satellites and/or acoustic or inertial positioning systems, and optionally having a location defined by a depth below sea level.

ROV—A remotely operated vehicle; often an aquatic vehicle. Although for purposes of convenience and brevity ROVs are described herein, nothing herein is intended to be limiting to only vehicles that require remote operation. Autonomous vehicles and semi-autonomous vehicles are within the scope of this disclosure.

SLAM-Net engine—A collection of modules, according to some embodiments, which is responsible for aspects of simultaneous localization and mapping.

Visualization engine—A collection of modules, according to an embodiment of this invention, which is responsible for producing the displayed aspect of the navigation interface.

System

Hardware and Devices

Referring now to the drawings, wherein like reference numerals designate identical or corresponding parts throughout the several views, FIG. 1A diagrammatically depicts a system according to an embodiment of the invention. This system includes an ROV and its associated instrumentation 1, an operating system housed within computer hardware 3 and a user interface and its associated devices 2. The operating system 3 mediates interaction between the ROV 1 and the user 4, such that the user may submit commands and inquiries for information to the ROV 1, and obtain mechanical responses and data output from the ROV 1.

Figure 1B:
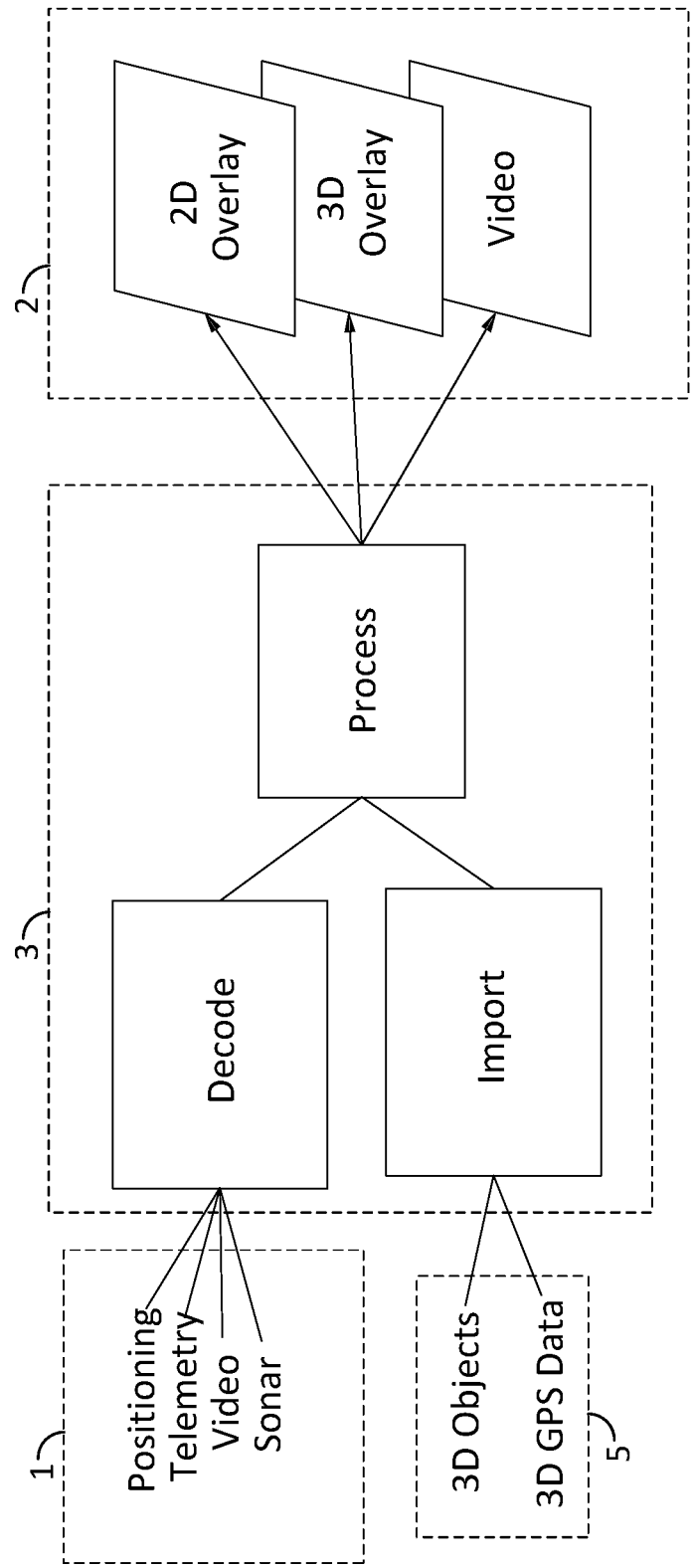
FIG. 1B shows a diagrammatic view of a system and its associated functions, according to some embodiments.

As seen from FIG. 1B, the operating system 3 may receive live information obtained by the ROV's 1 multibeam 3D real-time sonar, telemetry data, positioning data and video as well as programmed 3D objects from a database 5, and process that data to provide live 3D models of the environment for both augmented reality and full 3D rendering displayed at the user interface 2. The user interface 2 may also be used to display video obtained using the ROV's 1 digital instrumentation, including, for example, cameras and other sensors. The ROV 1 utilized in the system of the present invention is equipped with conventional instrumentation for telemetry and positioning, which are responsive to the commands mediated by the operating system 3.

In one embodiment of the invention, the hardware for the operating system 3 includes a high-end rack computer that can be easily integrated with any ROV control system. The several software modules that further define the operating system will be described in further detail infra.

Figure 2A:
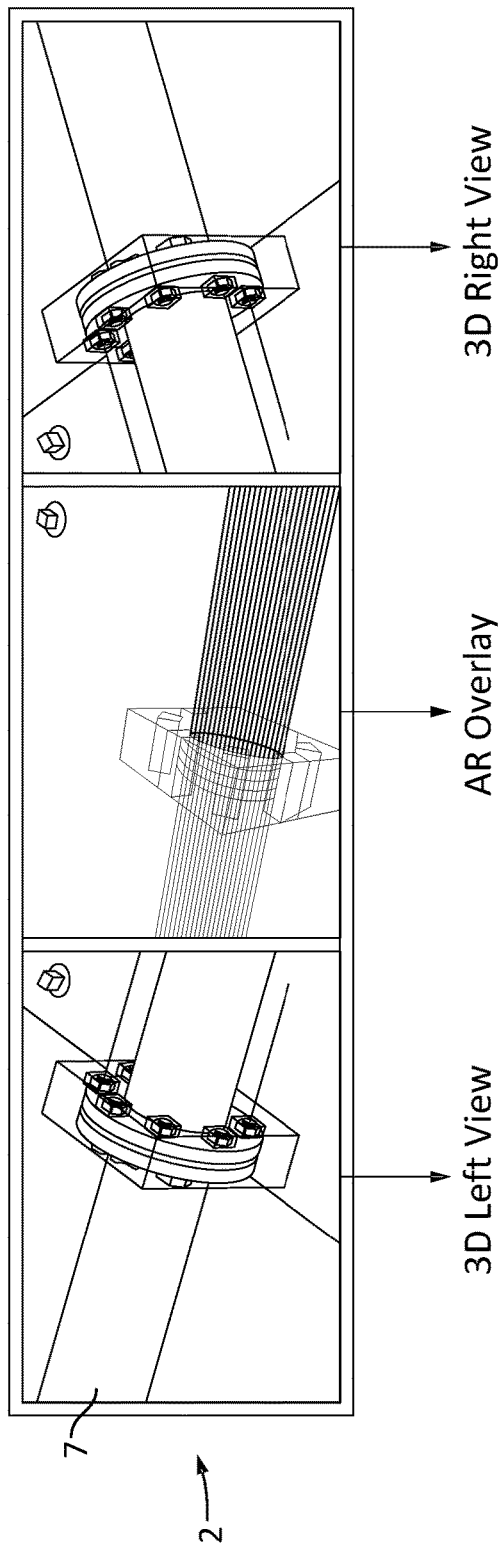
FIGS. 2A and 2B depict alternative views of a user interface of a system according to some embodiments.
Figure 2B:
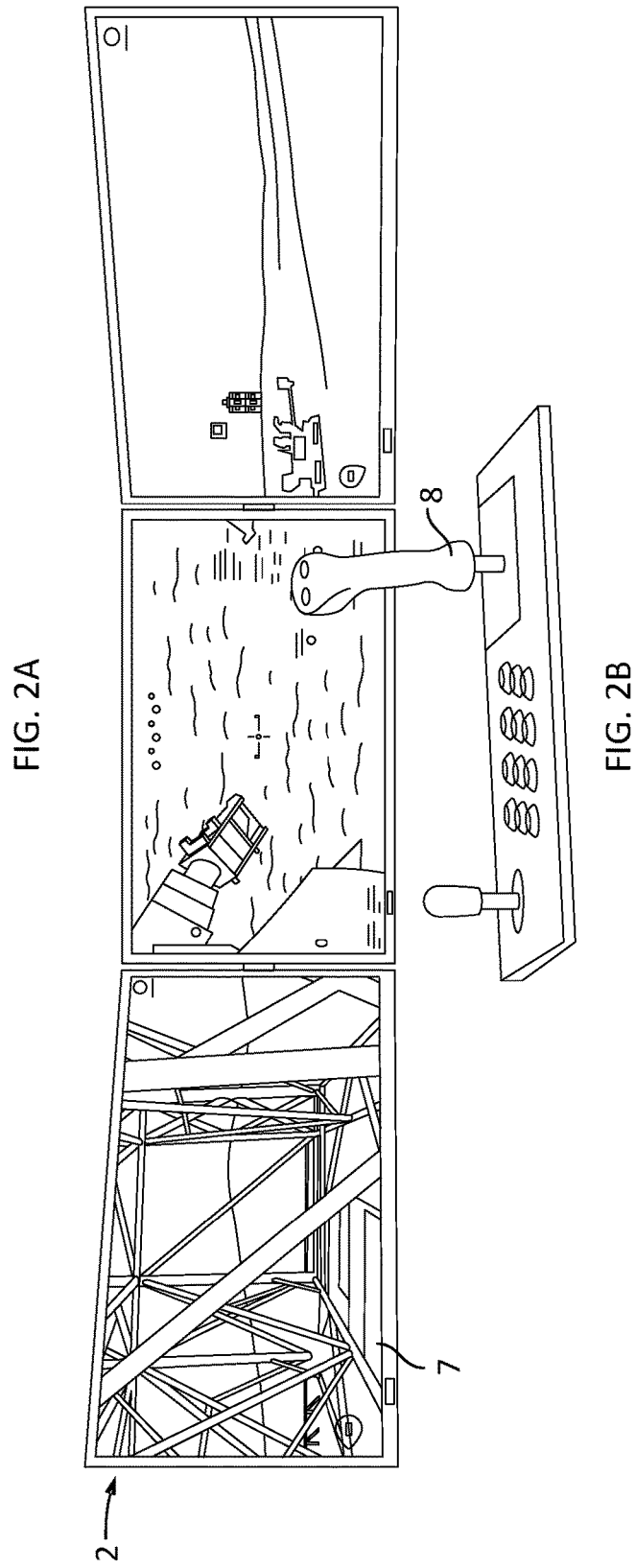

With reference to FIGS. 2A and 2B, the human-machine interface includes at least one monitor 7, and preferably three interactive monitors 7 for navigation. According to one embodiment shown in FIG. 2A, the center monitor 7 provides a video feed and augmented reality (AR), while the side monitors provide an expansion of the field of view of operation. In another aspect, the side monitors may allow the user to have a panoramic view of the ROV environment using full 3D visualization from the point of view of the ROV. As seen in FIG. 2B, the interaction between the user and the system may utilize joysticks 8, gamepads, or other controllers. In another embodiment, the user interface 2 may employ touch or multi-touch screen technology, audio warnings and sounds, voice commands, a computer mouse, etc.

Functional Modules

Rather than developing a different operating system 3 for each brand and model of ROV 1, the embodiments described herein work by abstraction, such that the disclosed operating system 3 and associated hardware work the same way with all ROVs 1. For example, if one component delivers "$DBS, 14.0,10.3" as a depth and heading coordinates, and another component delivers "$HD,15.3,16.4" as heading and depth coordinates, these data strings are parsed into their respective variables: Depth1=14.0, Depth2=16.4, Heading1=16.4, Heading2=15.3. This parsing allows both system to work the same way, regardless of the data format details.

By developing a layer of abstraction of drivers for communication between the operating system 3 and the ROV hardware, the user 4 is provided with seamless data communication, and is not restricted to using particular ROV models. This abstraction further allows users 4 and systems 3 to communicate and network information between several systems and share information among several undersea projects. The use of a single system also allows for cost reduction in training, maintenance and operation of this system.

Figure 3A:
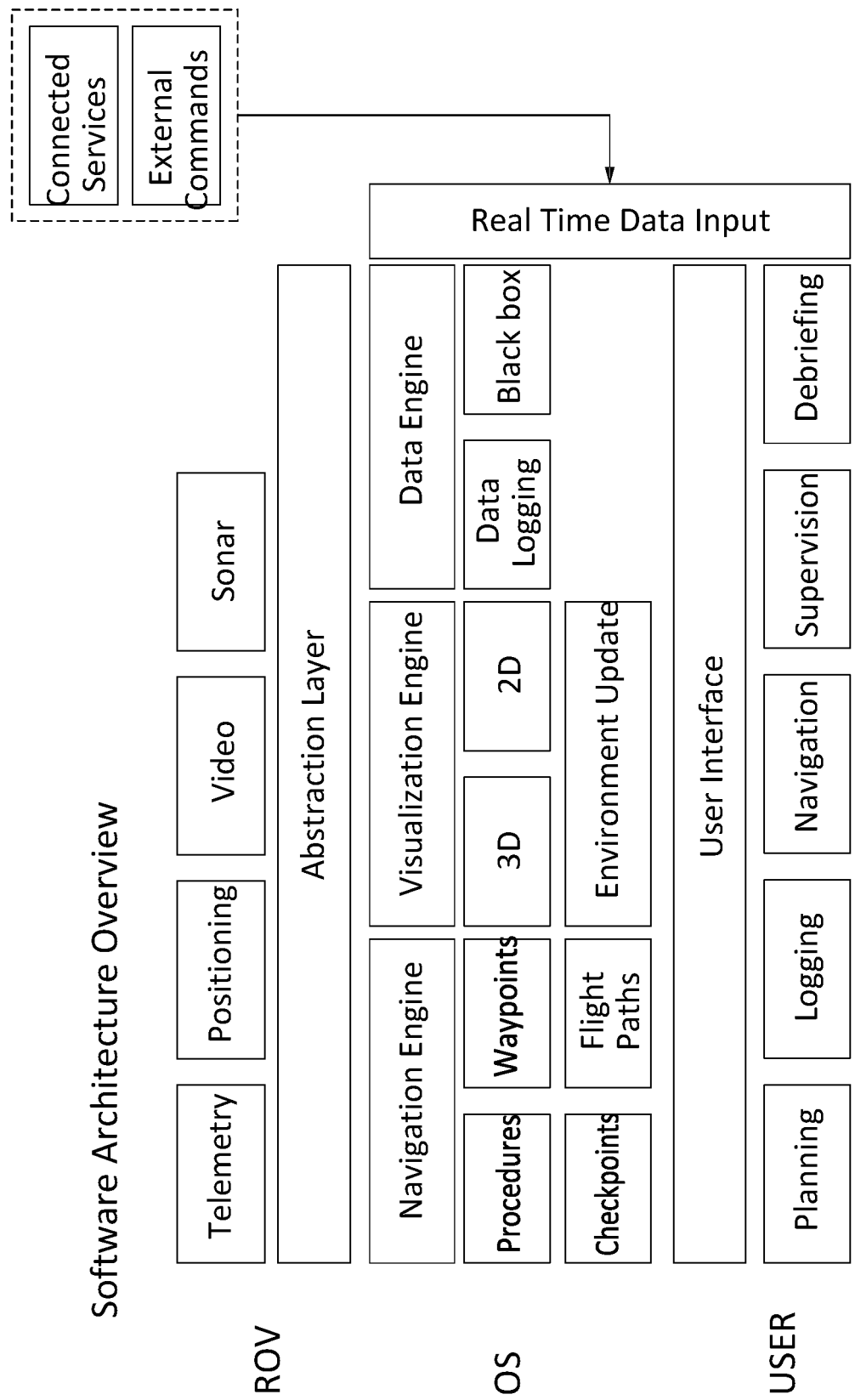
FIGS. 3A and 3B show software architecture overviews of a system, according to some embodiments.

FIG. 3A depicts a software architecture overview illustrating the component parts of the ROV 1, user interface 2 and operating system 3. Software counterparts are provided for the ROV's telemetry, positioning, video and sonar instrumentation. In order to implement user functions including planning, logging, navigation, supervision and debriefing, the operating system 3 provides a navigation engine, a visualization engine and a data engine. The operating system 3 is networked such that connected services and external command units can provide real-time data input. One of such external command units may be configured as a watchdog. The external watchdog system may perform periodic checks to determine whether the system is working properly, or is in a fail state. If the system is in a fail state, the watchdog may change the monitors' inputs, or bypass them, to a conventional live video feed until the system is operating correctly.

Figure 3B:
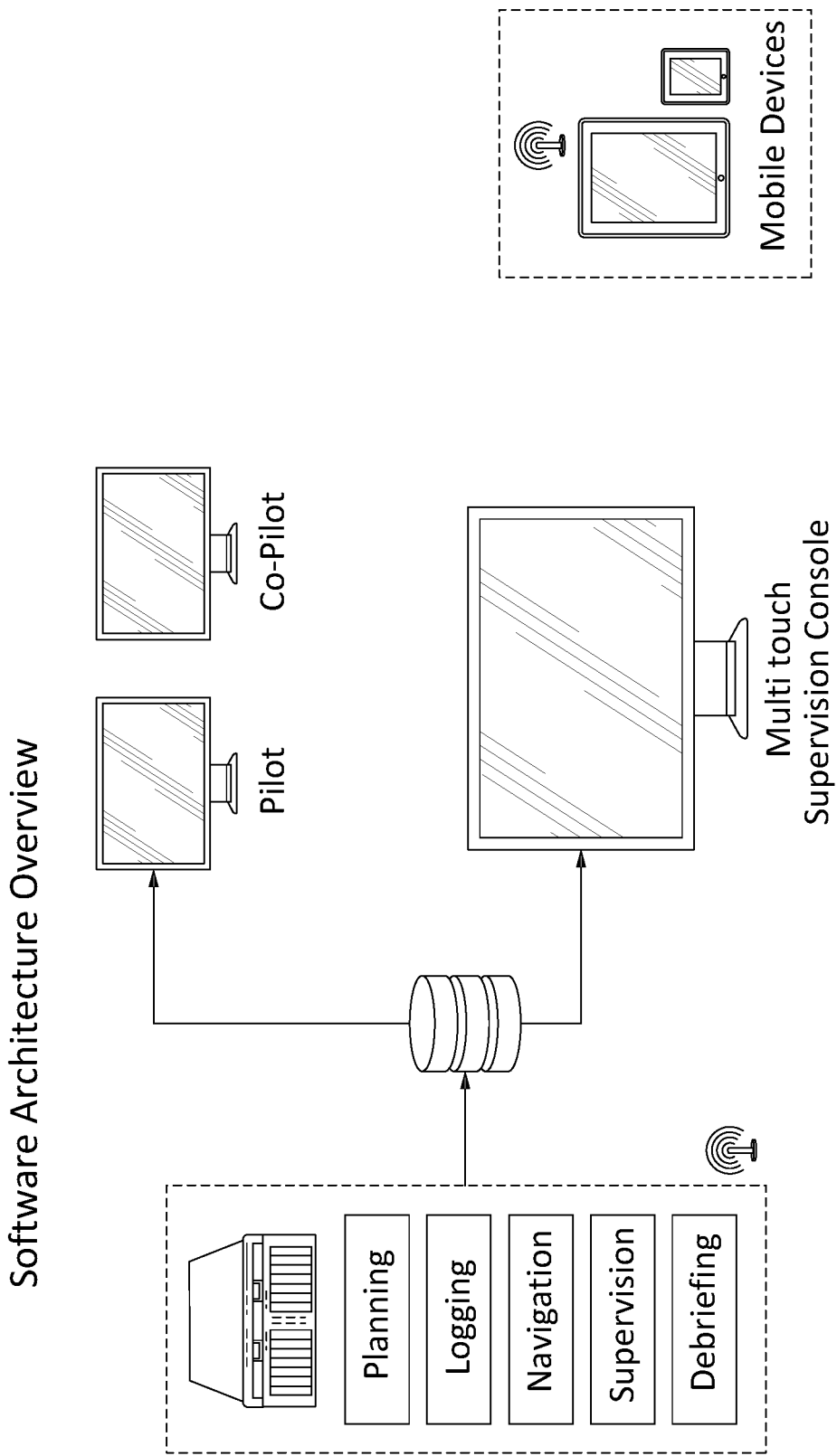
Figure 3C:
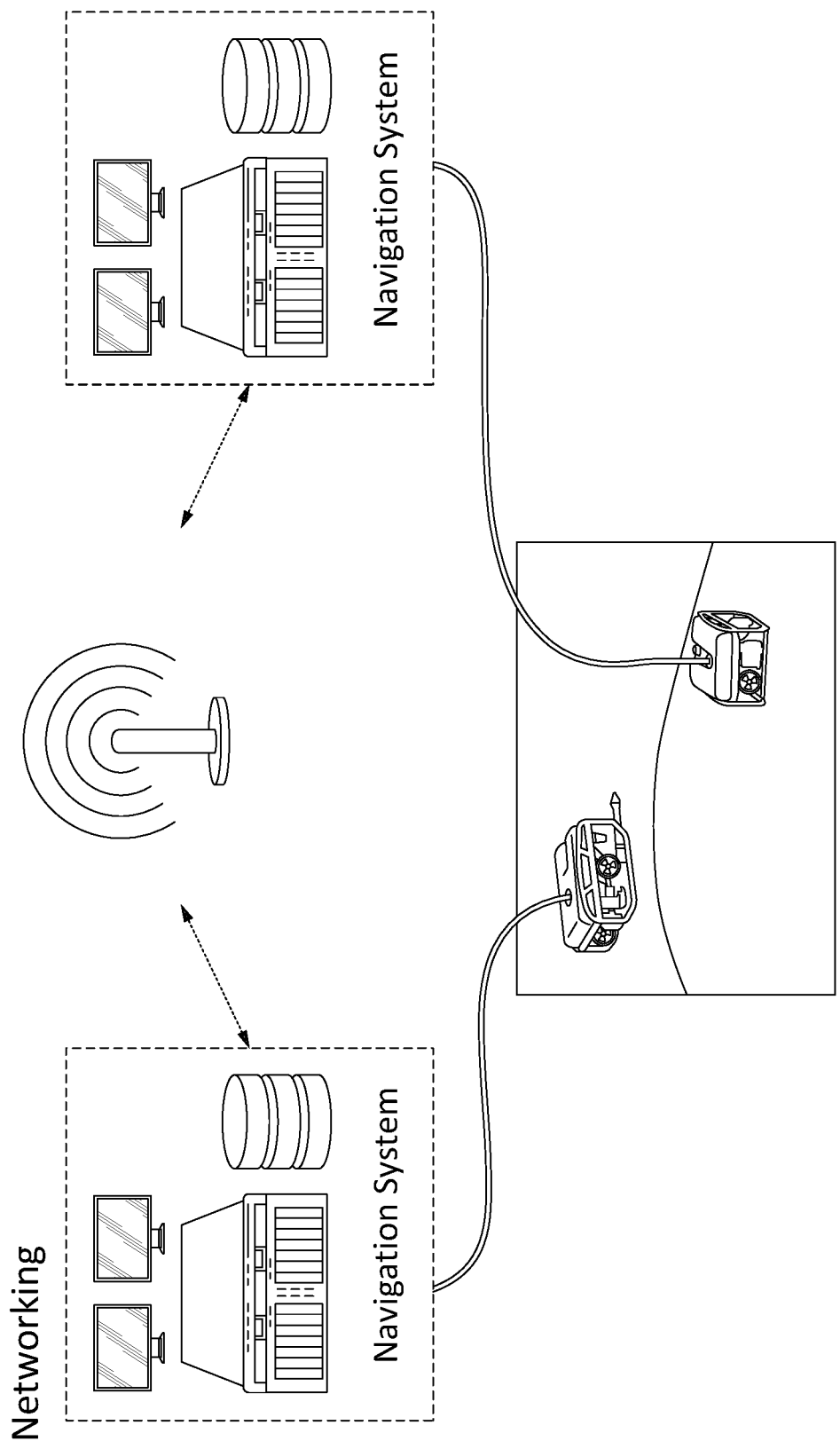
FIG. 3C is a diagrammatic illustration of networked systems, according to some embodiments.

FIG. 3B depicts a further software architecture overview illustrating that the operating system 3, which mediates the aforementioned user functions, is networked to provide communication between a multi touch supervision console and a pilot or pilots. FIG. 3C illustrates yet another level of connectivity, wherein the navigation system of a first ROV may share all of its dynamic data with the navigation system of another ROV over a network.

Visualization Engine

Figure 4:
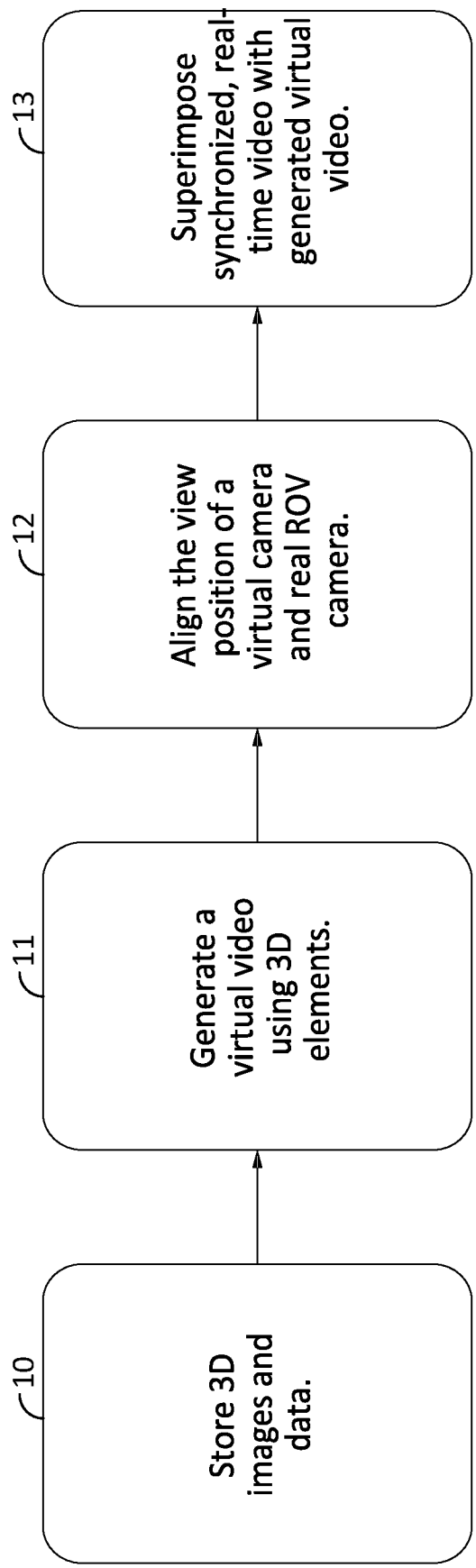
FIG. 4 depicts modules for achieving hybrid 3D imagery, and a method for their use, according to some embodiments.

As seen from FIGS. 1B and 3A, the operating system's 3 visualization engine further includes modules for implementing 3D imagery, two-dimensional ("2D") imagery, and providing a real-time environment update. These modules are shown in FIG. 4, which illustrates in a stepwise fashion how the system operates in some embodiments to create superimposed hybrid 3D imagery.

A 3D database module 10 includes advanced 3D rendering technology to allow all the stages of ROV operation to be executed with reference to a visually re-created 3D deep-water environment. This environment is composed by the seabed bathymetry and modeled equipment, e.g., structures of ocean energy devices.

As discussed above, the main sources of image data may be pre-recorded 3D modeling of sonar data (i.e., computer-generated 3D video) and possibly other video data; live sonar data obtain in real time; video data obtained in real time; user-determined 3D elements; and textual or graphical communications intended to be displayed on the user interface screen. The geographical position and depth (or height) of any elements or regions included in the image data are known by GPS positioning, by use of acoustic and/or inertial positioning systems, and/or by reference to maps, and/or by other sensor measurements.

In some embodiments, a virtual video generation module 11 is provided for using the aforementioned stored 3D elements or real-time detected 3D elements to create a virtual video of such 3D elements. The virtual video generation module 11 may work in concert with a synchronization module 12.

The synchronization module 12 aligns the position of the virtual camera of the virtual video with the angle and position of a real camera on an ROV. According to some embodiments the virtual camera defines a field of view for the virtual video, which may extend, for example, between and 144 degrees from a central point of view.

Figure 5A:
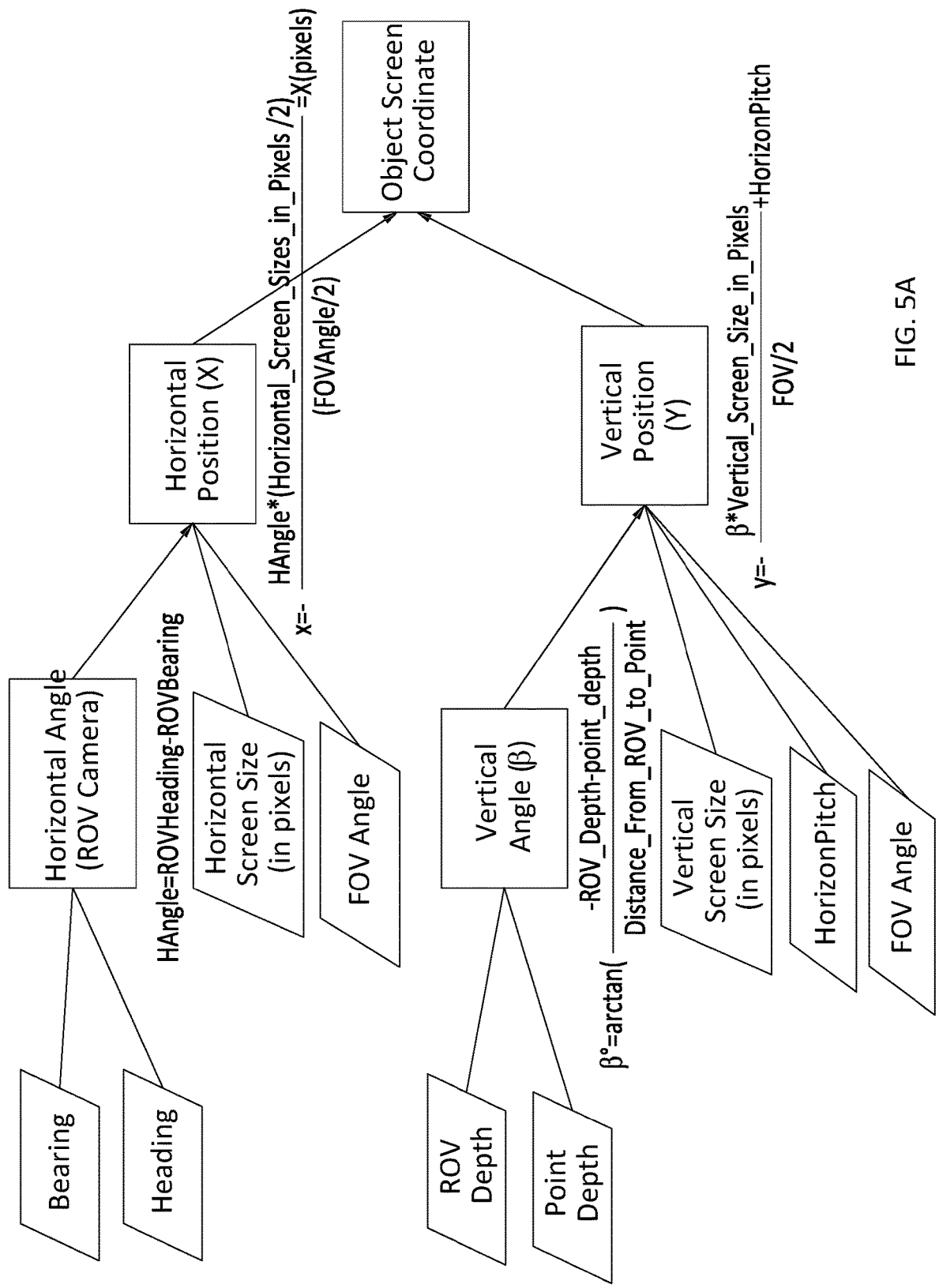
FIG. 5A illustrates calculations for aligning a virtual video and a real video, according to some embodiments.

As illustrated in FIG. 5A, the alignment of virtual and real camera angles may be accomplished by calculating the angle between the heading of the ROV and the direction of the camera field of view; calculating the angle between the vertical of the ROV and the direction of the camera field of view; and calculating the angle between the ROV and the geographic horizon. These calculated angles are then used to determine an equivalent object screen coordinate of the digital X-Y axis at determined time intervals or anytime a variable changes value.

Figure 5B:
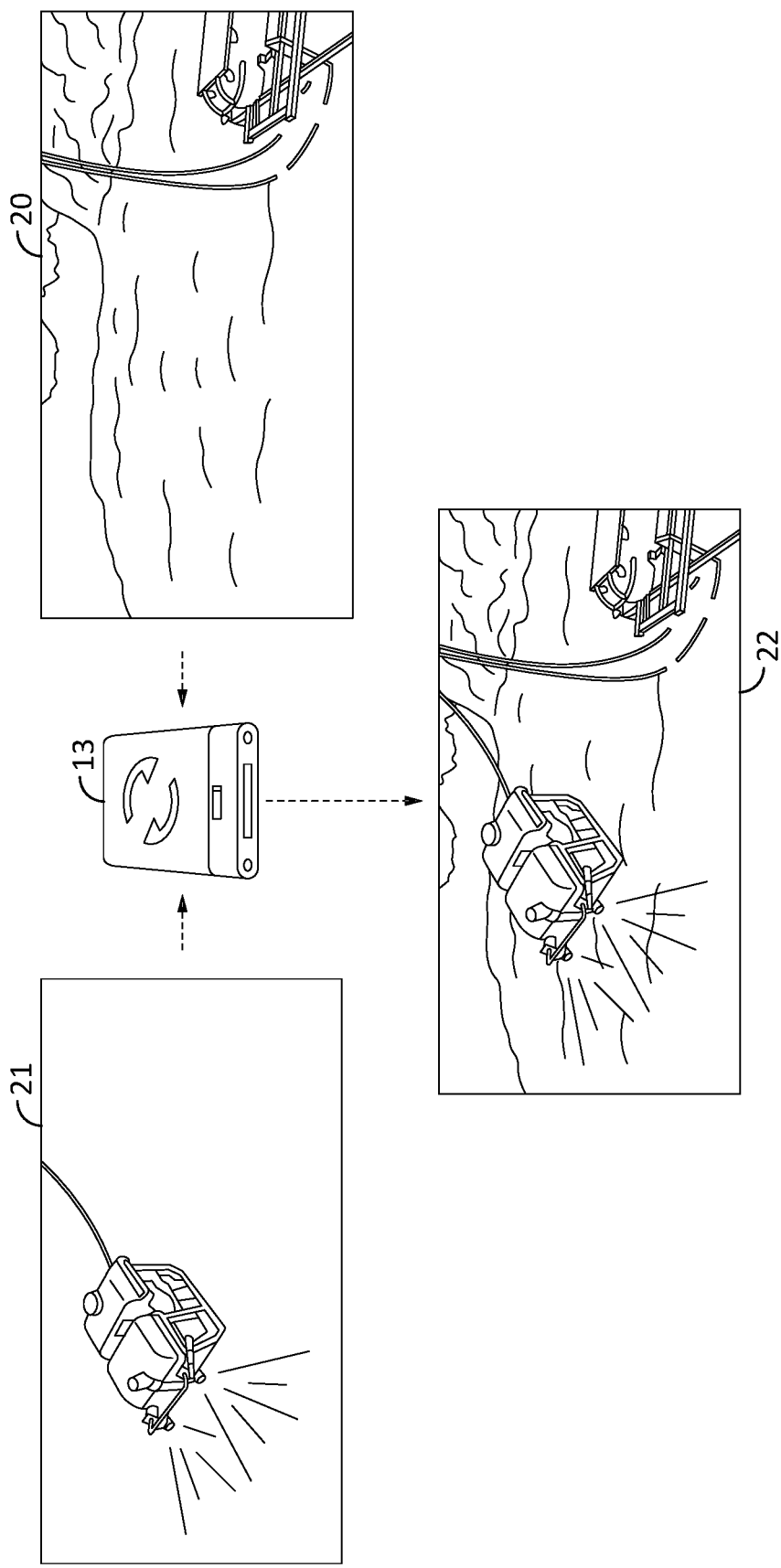
FIG. 5B illustrates hybrid 3D imagery obtained by superimposing a virtual video and a real video, according to some embodiments.

A superimposition module 13, whose function is additionally diagrammed in FIG. 5B, is provided for superimposing the generated virtual video 20 and the synchronized, real-time video 21 acquired by the ROV's digital camera. The result is hybrid superimposed 3D imagery 22, wherein the system effectively draws the generated 3D environment on top of the non-visible part of the video feed, thus greatly enhancing visibility for the ROV pilot. More specifically, the superimposition software divides the camera-feed video and the generated 3D video into several layers on the z-buffer of the 3D rendering system. This permits the flattening of the layers and their superimposition, which simulates spatial perception and facilitates navigation.

Yet another feature of the superimposition module 13 is that either one or both of the virtual 20 or real videos 21 may be manipulated, based upon a luminance threshold, to be more transparent in areas of lesser interest, thus allowing the corresponding area of the other video feed to show through. According to some embodiments, luminance in the Red-Green-Blue hexadecimal format may be between 0-0-0 and 255-255-255, and preferably between 0-0-0 and 40-40-40. Areas of lesser interest may be selected by a system default, or by the user. The color intensity of images in areas of lesser interest is set at the luminance threshold, and the corresponding region of the other video is set at normal luminance. For the example shown in FIG. 5B, the background of the virtual video 20 is kept relatively more transparent than the foreground. Thus, when the real video 21 is superimposed on the virtual 3D image 20, the real video 21 is selectively augmented primarily with the virtual foreground, which contains a subsea structure of interest.

Navigation Engine

The on-screen, 2D Navigation Interface for the ROV pilot involves superimposing geopositioned data or technical information on a 2D rendering system. Geopositioning or geo-tagging of data and elements is executed by reference to maps or to global positioning satellites. The resulting Navigation Interface, as seen in FIGS. 6A-6D, is reminiscent of aviation-type heads up display consoles. In the case of subsea navigation, the display is configured to indicate ROV 1 position based on known coordinates, and by using a sonar system that records 3D images from a ROV's position for later navigation. In this way, the embodiments described herein provide immersive visualization of ROV's operation.

Figure 6A:
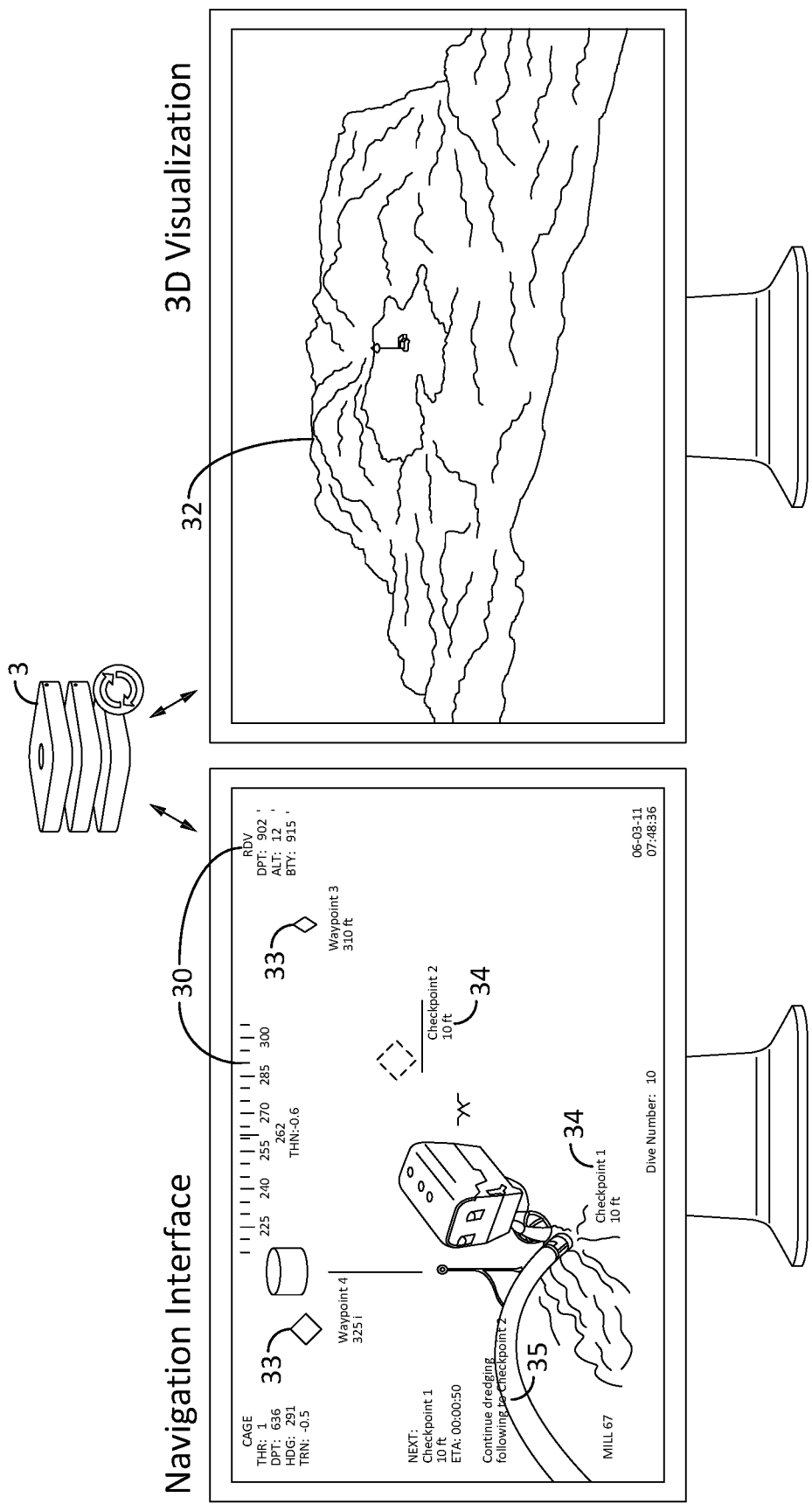
FIGS. 6A-6E depict several views of a navigation interface, according to some embodiments.
Figure 6B:
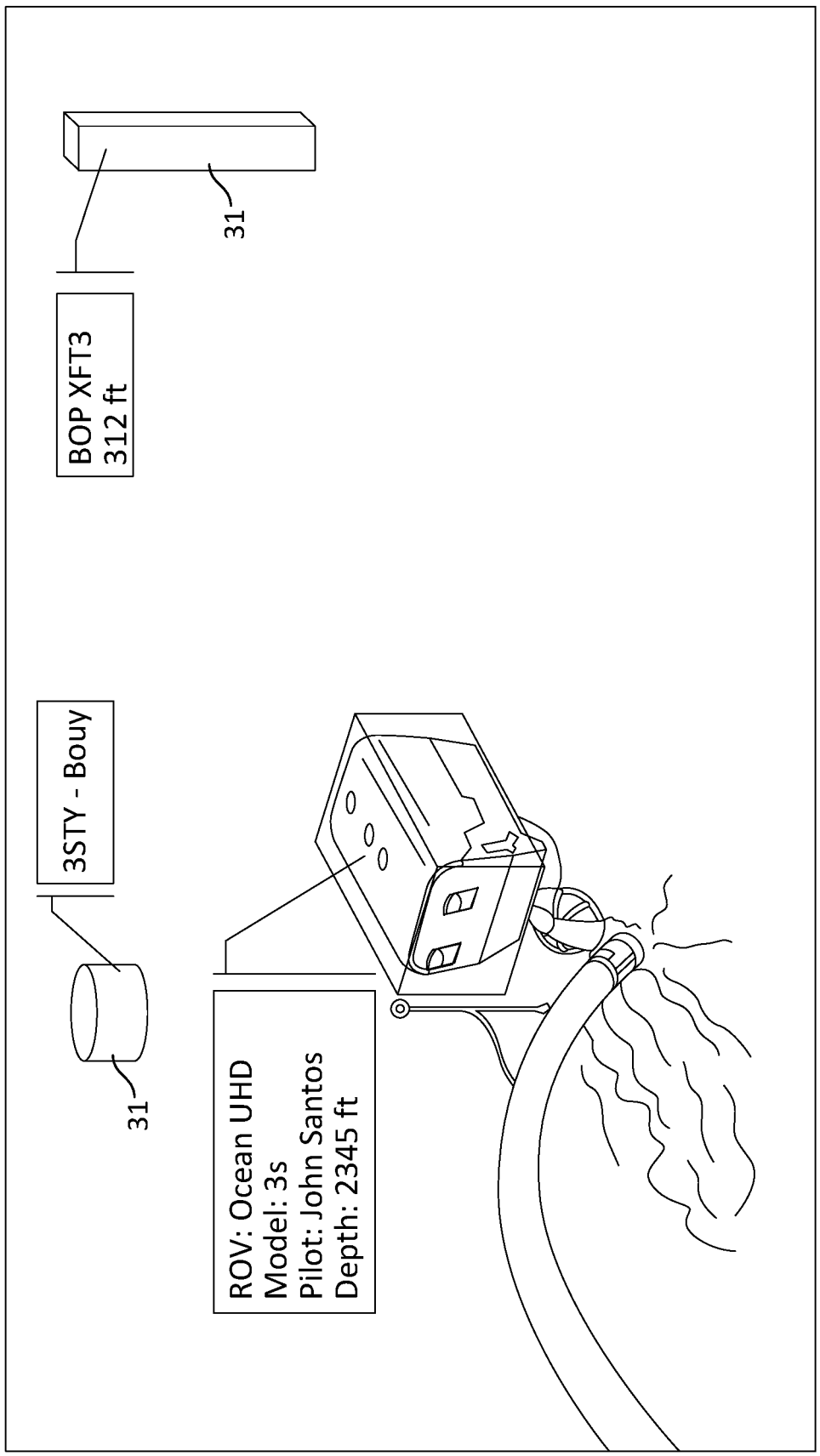

FIG. 6A illustrates the superposition of textual information and symbols 30 onto the 2D video rendering of the ROV user interface. FIG. 6B illustrates the superposition of 3D elements 31 onto the video rendering. The superposition of these data onto the video feed is useful, not only for navigating and controlling the ROV 1, but also for executing the related planning and supervising functions of the operating system 3. This superposition may be accomplished in a similar way to the superimposition of the video feeds, i.e., by obtaining screen coordinates of an object, and rendering text and numbers near those coordinates.

The planning module enables engineers and/or supervisors to plan one or several ROV missions. Referring again to FIG. 6A, an important feature of the planning module is the input and presentation of bathymetry information 32 through 3D visualization. As seen on the Navigation Interface, waypoints 33 and checkpoints 34 are superimposed onto the video feed. These elements may be identified, for example, by number, and/or by distance from a reference point. In other words, in addition to superimposing the technical specifications and status information 30 for the ROV 1 or other relevant structures, the Navigation Interface also provides GPS-determined positions for navigation and pilot information.

In some embodiments, procedures 35, including timed procedures (fixed position observation tasks, for example), may be included on the Navigation Interface as text. Given this procedural information, a ROV pilot is enabled to anticipate and complete tasks more accurately. A user may also use the system to define actionable areas. Actionable areas are geopositioned areas in the undersea environment that trigger a system action when entering, leaving, or staying longer than a designated time. The triggered action could be an alarm, notification, procedure change, task change, etc.

Figure 6C:
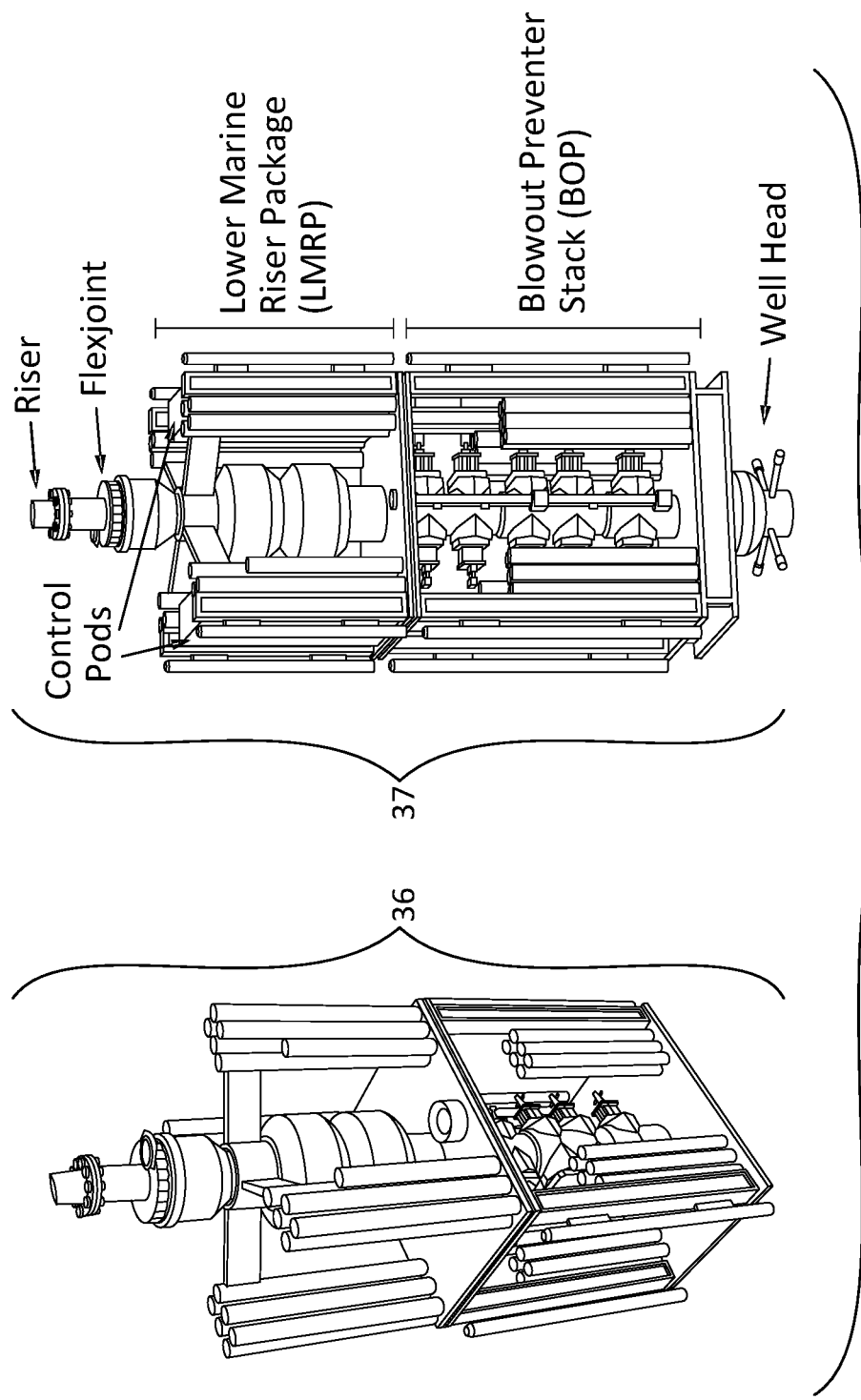

Referring to FIG. 6C, using a series of rules established in the planning module, or by manual input, the system may show more or less 2D geo-tagged information on the Navigation Interface. For example, as seen at 36, during a ROV operation when the pilot is at 100 meters from a geo-tagged object, the system may show only general information relating to the overall structure, or specific information needed for a specific current task in the nearby area. As the pilot approaches the geo-tagged structure, shown at 37, the system may incrementally show more information about components of that structure. This dynamic and manual level of detail control may apply to both textual and symbolic information 30, as well as to the augmentation of 3D elements 31.

Figure 6D:
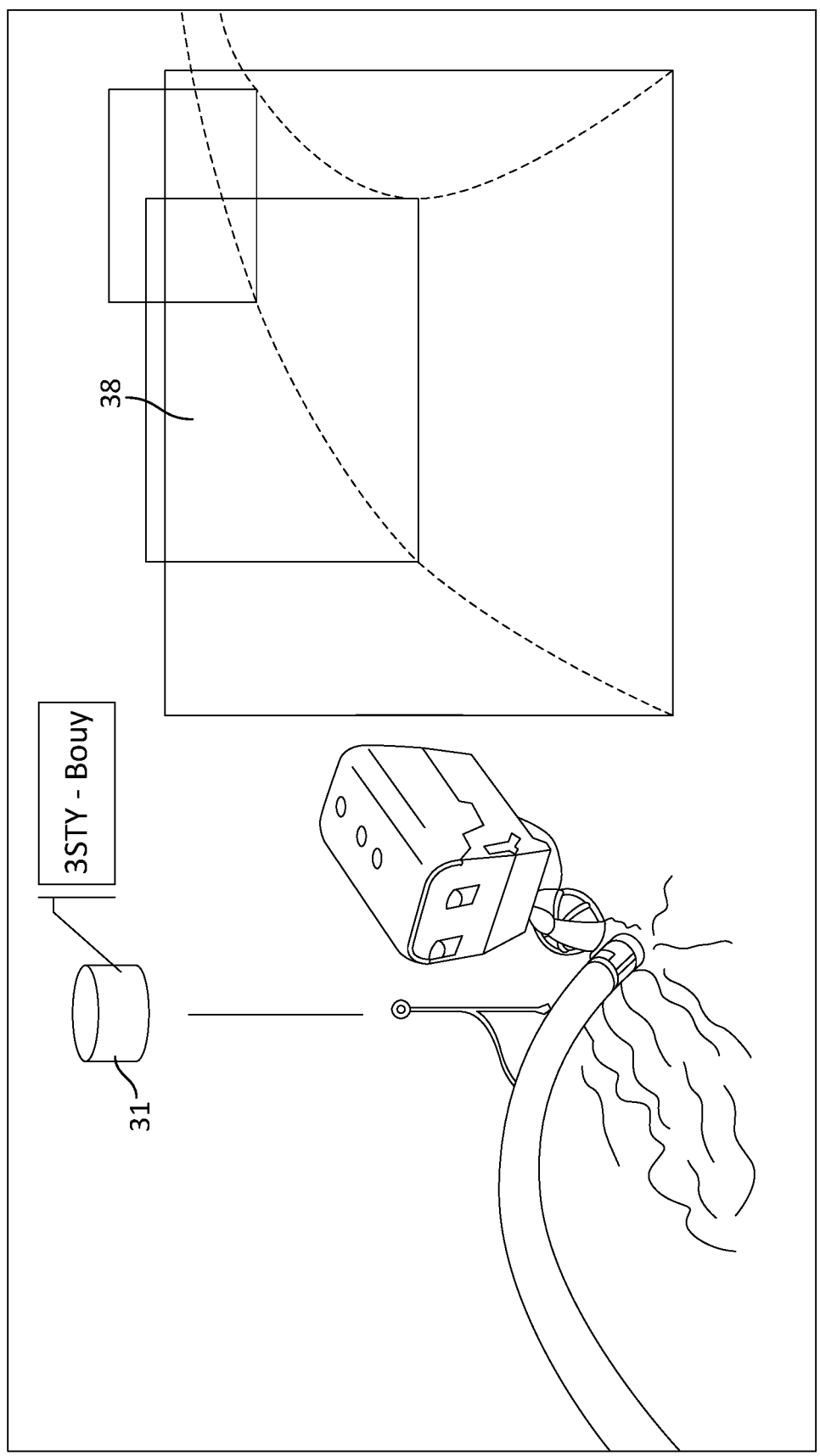
Figure 6E:
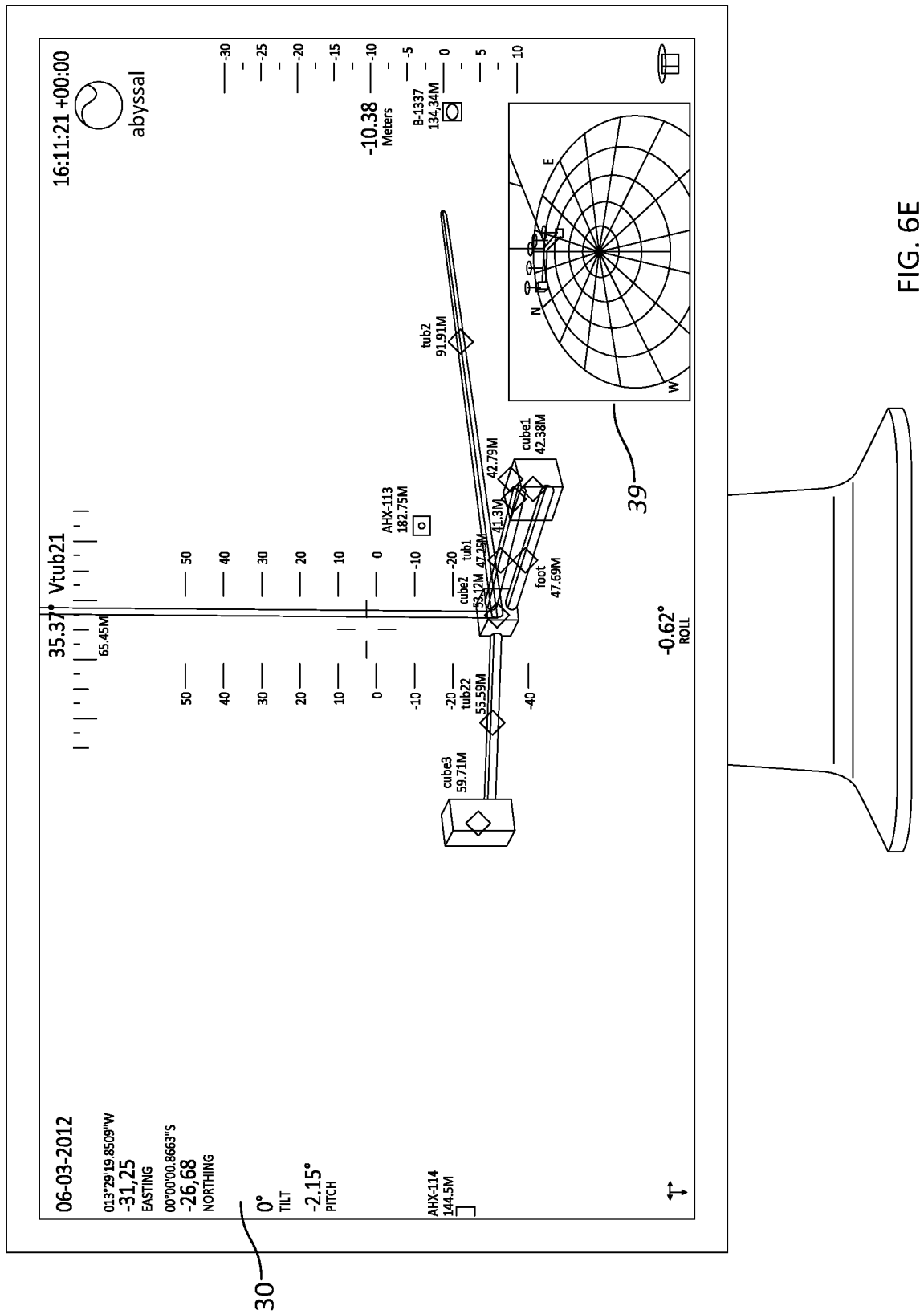

With reference to FIG. 6D, the planning module may also provide on-screen information relating to flight path 38. As seen in FIG. 6E, another important feature of the invention is embodied by a minimap 39, i.e., a graphic superimposed on the video, which may include a variety of different representations, such as small icons representing target objects. The minimap 39 may show the cardinal points (North, South, East, West) in a 3D representation, optionally in addition to a representation of a relevant object in tridimensional space. The minimap 39 may be positioned in a corner, and may be moved, dismissed and recalled by the user.

Data Engine

The data engine, which mediates the data warehousing and data transfer functions of the invention, therefore incorporates the logging and supervising modules.

The logging module logs or records all information made available by the operating system and saves such data in a central database for future access. The available information may include any or all telemetry, sonar data, 3D models, bathymetry, waypoints, checkpoints, alarms or malfunctions, procedures, operations, and navigation records such as flight path information, positioning and inertial data, etc.

An essential part of any offshore operation providing critical data to the client after the operation is concluded. After the operation, during the debriefing and reporting stage, the debriefing and reporting module may provide a full 3D scenario or reproduction of the operation. The debriefing and reporting module may provide a report on the planned flight path versus the actual flight path, waypoints, checkpoints, several deviations on the plan, alarms given by the ROV, including details of alarm type, time and location, procedures, checkpoints, etc. ready to be delivered to the client. Accordingly, the operating system is configured to provide four-dimensional (three spatial dimensions plus time) interactive reports for every operation. This enables fast analysis and a comprehensive understanding of operations.

Yet another software element that interacts with of the Navigation Interface is the supervisor module. Execution of the supervisor module enables one or more supervisors to view and/or utilize the Navigation Interface, and by extension, any ROV 1 being controlled from the interface. These supervisors need not share the location of the ROV pilot or pilots, but rather may employ the connectivity elements depicted in FIGS. 3B and 3C. A plurality of multi touch supervision consoles may be used at different locations. For example, one could have nine monitors connected to three exemplary hardware structures, including an ROV 1, where only one operating system 3 gathered the ROV data and shared information with the others. Alternatively, between one and 12 networked monitors may be used, and preferably between 3 and 9 may be used. Networking provided as shown in FIGS. 3B and 3C may reduce risks, such as human error, in multiple-ROV operations, even those coordinated from separate vessels. Networking through the supervisor module allows for the sharing of information between ROV systems, personnel and operations across the entire operation workflow.

Unsupervised SLAM from Video with Adversarial Shape Prior Learning

Yet another feature according to some embodiments disclosed herein is the ability to perform unsupervised SLAM from video with adversarial shape prior learning. Embodiments disclosed herein may be used for wide-ranging applications. For example, in some embodiments, the SLAM-Net engine may be used for smoothing positional sensor output and for obtaining an accurate 3D reconstruction of a scene in real-time or near real-time. Additionally or alternatively, the SLAM-Net engine may be used as a building block for augmented reality applications, robotic applications, and autonomous vehicle applications. Similar to other machine learning systems and methods, SLAM-Net first trains a model offline and then uses the trained model in an application to provide value to the user. These two stages, training and inference, have different hardware and software components. The SLAM-Net engine and components are further described herein and shown with respect to FIG. 7. In some embodiments, the training portion (the upper portion of FIG. 7) may be performed offline and have its own set of hardware, while the inference portion of FIG. 7 (i.e., the lower portion of FIG. 7) is performed in real-time (or near real-me) and is integrated with the system in FIG. 1. In some embodiments, the training portion produces the model's weights that are then copied inside the operating system 3 to be used by the SLAM-NET application 79.

Figure 7:
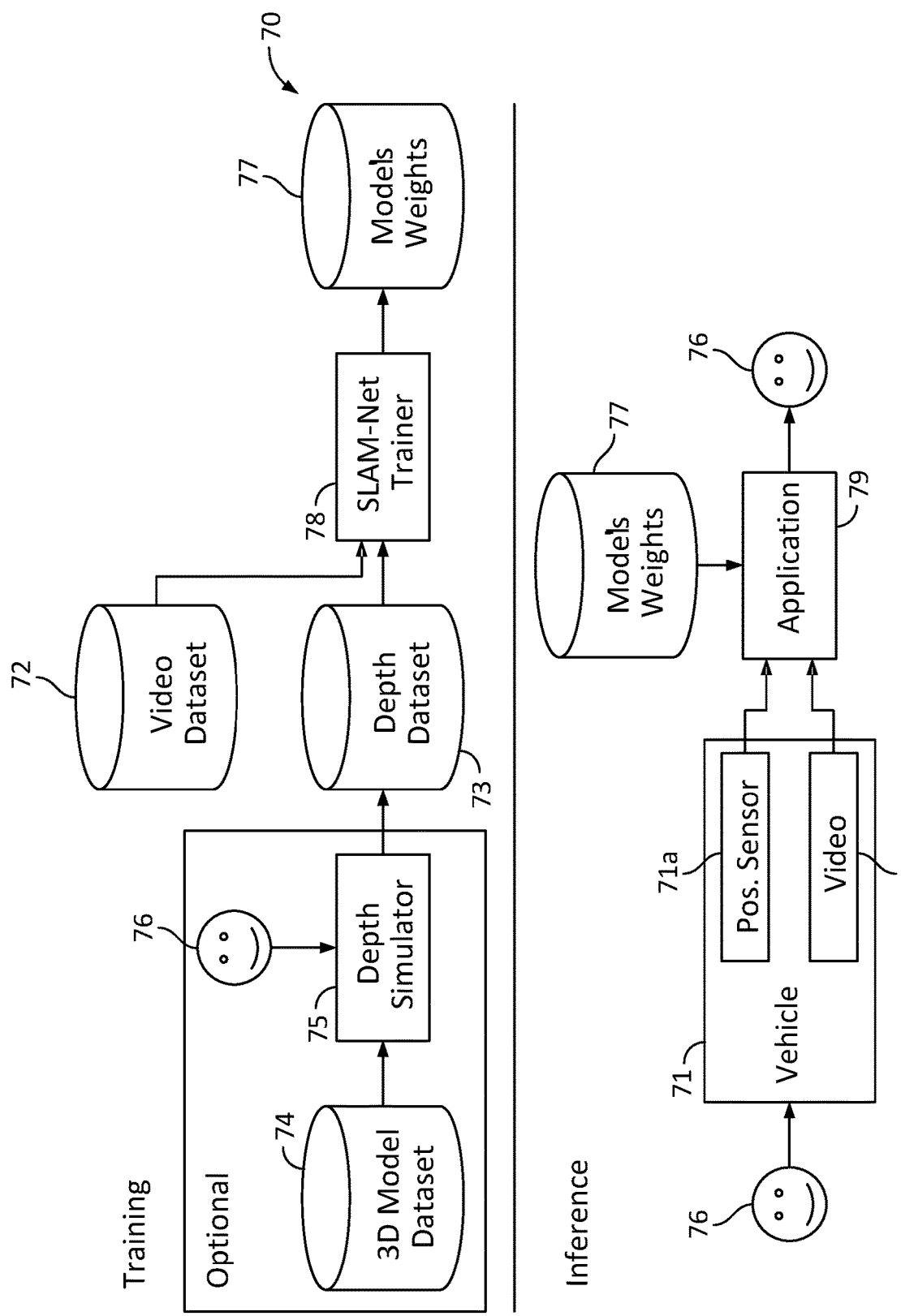
FIG. 7 illustrates a block-diagram overview of components of a SLAM-Net engine, according to some embodiments.

FIG. 7 illustrates a block-diagram overview of components of a SLAM-Net engine 70, including ROV 71 with telemetry 71$a$ (such as positional sensors) and video capability 71$b$ (such as a video camera), video dataset 72, depth dataset 73, 3D models dataset 74, depth map simulator 75, graphical user interfaces (GUI) 76, a model's weights dataset 77, a SLAM-Net trainer module 78, and an application module 79.

The ROV 71 may be similar to or the same as, and operate in a similar manner to or the same as, ROV 1 described herein and shown in FIG. 1A. Although a ROV 71 is used herein for purposes of convenience, brevity, and consistency, nothing herein is intended to be limiting and the ROV could be any vehicle with telemetry and video, such as a ROV with an ultra-short baseline (USBL) sensor, a car or a smartphone with an inertial measurement unit, global positioning system sensor, or other telemetry, a quadcopter with an inertial measurement unit or global positioning sensor, or other vehicles. The vehicle should be connected to the SLAM-Net engine 70 either directly or indirectly (e.g., wirelessly via GSM, Wi-Fi, etc., or wired via cable, tether, fiber optics, etc.). The vehicle should also include a camera, such as a monocular video camera.

SLAM-Net engine 70 includes various datasets, which may operate like, or in conjunction with, the data engine described herein and shown in FIG. 3A. More specifically, the video dataset 72 may store video, such as video coming from one or more ROV 71. In some embodiments, the videos will come from the same domain of application where the system will be deployed. For instance, if the system is to be deployed on an underwater ROV, the dataset may contain underwater videos. SLAM-Net engine 70 may include a depth dataset 73 that is a dataset containing depth maps. The 3D model dataset 74 may be the same, or similar to, database 5. The 3D model dataset 74 may include 3D models of the scenes similar to the domain of application of the embodiment. This 3D model dataset 74 may be useful in combination with the depth map simulator 75. The depth map simulator 75 may synthesize a depth map. The depth map simulator 75 may have access to a 3D model of a scene, e.g., from 3D model dataset 74 and may have access to a camera's intrinsic and extrinsic parameters. The depth map simulator 75 may have a GUI 76 (or other user interface) that displays an output to a user and allows the user to specify the number of random depth maps to be synthesized or to specify a set of camera intrinsic and extrinsic parameters from where to synthesize the depth maps. SLAM-Net engine 70 may have a model's weight dataset 77 that saves the weights of SLAM-Net data.

SLAM-Net engine 70 may include a SLAM-Net trainer module 78. The SLAM-Net trainer module 78 may be used to train SLAM-Net engine 70 and may have access to, for example, the video dataset 72 and the depth dataset 73. After a SLAM-Net engine 70 model is trained, its parameters may be saved in the model's weight dataset 77. In some embodiments, the trainer module 78 produces the model's weight dataset 77, which is then copied to the operating system 3 to be used by the application module 79. To increase efficiency and the speed of training, the SLAM-Net trainer module may include one or more general purpose graphics processing units (GPGPU).

SLAM-Net engine 70 may include an application module 79. The application module 79 may be operable to run convolutional neural networks (CNN) with a GPGPU. In some embodiments, the application module 79 may be run in the operating system 3. In some embodiments, the application module 79 may receive video and telemetry (e.g., positional sensor output) from the ROV 71, run the model saved in the model's weights dataset 77, and save the smoothed positional sensor values in memory. Additionally or alternatively, in some embodiments the application module 79 may reconstruct the scene being displayed in the video and save it in memory. The application module 79 may also include a GUI 76 (or other user interface) showing the reconstructed 3D scene and the position of the ROV 71 in the scene.

Figure 8:
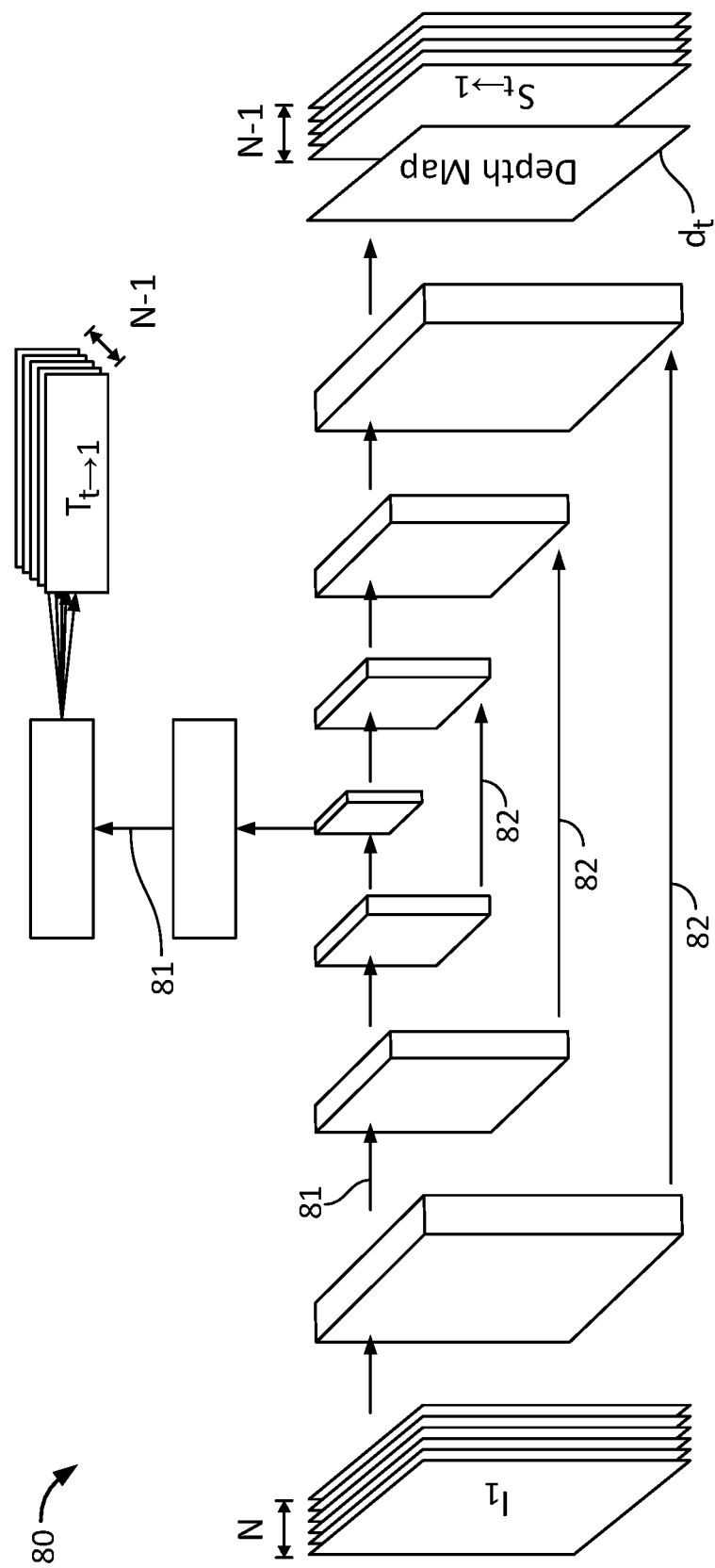
FIG. 8 illustrates a block-level overview of a SLAM-Net architecture, according to some embodiments.

FIG. 8 illustrates a block-level overview of a SLAM-Net architecture, according to some embodiments. The SLAM-Net architecture 80 may be used by SLAM-Net engine 70 and includes an input set of frames $I_1$ to $I_N$, a depth map $d_t$, a set of camera motions represented as transformation matrices. $T_{t \to i} \in SE(3)(1 \leq i \leq N, i \neq t)$, segmentation masks, $S_{t \to i}$ CNNs 81 (not all marked), and skip connections 82. In some embodiments, like that shown in FIG. 8, the SLAM-Net architecture 80 may predict the depth map of a target frame, the segmentation maps of the pixels that break the model's assumptions between the target and source frames, and the transformations between the target and source frames. The depth map and segmentation map may be predicted by a convolutional/deconvolutional neural network (like CNNs 81 shown in FIG. 8) with skip connections (like skip connections 82 shown in FIG. 8) to get high spatial precision. For the transformation predictions, the CNN's bottleneck is flattened and then fully-connected layers are used.

In some embodiments, the SLAM-Net engine 7b0 may be a CNN model that outputs a depth map of a target frame and N-1 camera motions. The SLAM-Net engine 70 may learn from a set of unlabeled videos by minimizing the photometric error between the target frame and the remaining N-1 frames. As most of the scenes do not follow the assumptions the photometric error makes, such as the Lambertian and Static world assumptions, the SLAM-Net engine 70 may also learn to segment the pixels that break these assumptions frame-wise.

SLAM-NET. The SLAM-Net engine 70 may receive as input a set of frames<$I_1, \ldots, I_N$>, where one of the frames is the target frame $I_t$, and may output the depth map $d_t$ of the target frame and a set of camera motions represented as transformation matrices $T_{t \to i} \in SE(3)(1 \leq i \leq N, i \neq t)$ between the target frame and each of the remaining frames. The SLAM-Net engine 70 may represent $T_{t \to i}$ as:

$$T_{t \to i} = \begin{bmatrix} R_{t \to i} & t_{t \to i} \\ 0 & 1 \end{bmatrix}, \tag{1}$$

where $R_{t \to i}$ is a 3×3 rotation matrix represented by Euler angles $\alpha, \beta, \gamma$ and $T_{t \to i}$ is 3 dimensional translation vector. In order to properly constrain the angle's values, our system outputs the sin $\alpha$, sin $\beta$ and sin $\gamma$ by using the tanh activation function that is bounded in the range (-1,1).

In some embodiments, the CNN architecture of the SLAM-Net engine 70 is depicted in FIG. 8. One technical solution provided by the embodiments disclosed herein, and with reference to FIG. 8, is the usage of N input images. Previous approaches typically require two networks, one for single-frame depth estimation and another for pose estimation that requires more than one frame. In contrast, the improvements provided by the SLAM-Net engine 70 include: 1) a single network may be used for depth and camera motion estimation, instead of two; and 2) by inputting several frames to the model, the CNN is capable of tracking points across several images to get a better depth map estimation. Single-frame depth estimation is a technical problem to solve, and SLAM-Net engine 70 improvements for frame depth estimation are discussed further herein with respect to the description with respect to inference optimization.

Photometric error. The SLAM-Net engine 70 may train this model in an unsupervised manner from unlabeled videos. Thus, the SLAM-Net engine 70 does not require ground-truth depth and camera motion data. The neural network's parameters are updated to minimize the photometric error between the target image and the remaining frames.

Having the camera intrinsic parameters K, it is possible to project homogeneous pixel coordinates from the target frame onto any of the other N-1 source frames by:

$$p_i = K(R_{t \to i} d_t(p_t) K^{-1} p_t + t_{t \to i}), \tag{2}$$

where $p_t$ are homogeneous pixel coordinates of the target frame and $P_i$ is the projection of $P_t$ in frame i. Then, following the Lambertian and the Static world assumptions, the SLAM-Net engine 70 may define the photometric error to be minimized:

$$\mathcal{L}_{ph} = \Sigma_i \Sigma_p |I(p) - I(p_i)|. \tag{3}$$

In some embodiments, discussed later, the SLAM-Net engine 70 may change to the loss of Equation 3 to drop the Lambertian and the Static world assumptions.

One technical problem with this projection is that $P_i$ is continuous. However, to access the pixel value of an image, the SLAM-Net engine 70 needs discrete value coordinates.

In some embodiments, a solution to this is for the SLAM-Net engine 70 to perform bilinear sampling by linearly interpolating the intensity values of the four discrete pixel neighbors of $p_i$ (e.g., the bottom-left, bottom-right, top-left, and top-right neighbors).

Point Tracking. The gradient computation for each target pixel is thus computed based on the four pixel neighbors of the N−1 source frames. But there are technical problems with this. For example, in instances when the camera motion and/or depth map estimation are very bad, resulting in $p_i$ being projected far from the correct value, or when the projected point lies in a textureless area, the SLAM-Net engine 70 may have difficulties learning. To overcome this problem, the SLAM-Net engine 70 uses two new approaches: 1) a curriculum learning setting where points are tracked across frames and the point correspondences are used as ground-truth, and 2) the introduction of a shape prior (discussed further below with respect to Unsupervised Depth Prior Learning).

As discussed previously, the loss in Equation 3 does not require point correspondences to be computed. However, the SLAM-Net engine 70 might have convergence issues due to the lack of depth and camera motion ground-truth data. On the other hand, SLAM systems may rely on point tracking to optimize for the structure of the scene and motion of the camera. The SLAM-Net engine 70 may track points across the source and target frames and use those as ground-truth point correspondences by minimizing:

$$\mathcal{L}_{cl}=\Sigma_i|p-p_i|. \quad (4)$$

To minimize the loss in Equation 4, the SLAM-Net engine 70 may use predicted camera motions $T_{i \to t}$ that are close to the real motion, assuming that the majority of the point correspondences are close to the correct value. This loss also has some positive effects on the depth estimation, although only on a limited set of points.

As the network starts to converge, this loss becomes less useful and might even produce negative effects when there are tracking errors. Therefore, the SLAM-Net engine 70 may exponentially decay the weight of this term at each training epoch:

$$\mathcal{L}=\mathcal{L}_{ph}+\lambda_{cl}\mathcal{L}_{cl}, \quad (5)$$

where $\lambda_{cl}$ is the weight of the curriculum learning loss that is updated at each epoch following the exponential decay rule $\lambda_{cl}=\lambda_{cin}e^{-\delta j}$, where $\lambda_{cin}$ is the initial curriculum learning weight, $\delta$ is the decay factor, and j is the current training epoch number.

Segmentation Masks. In some embodiments, relying on the Lambertian and Static world assumptions (that there are no occlusions between the target and source frames) may be a technical problem. To overcome these issues, the SLAM-Net engine 70 may predict the source frames' pixels that follow the model's assumptions.

As shown in FIG. 8, the SLAM-Net engine 70 may use SLAM-Net architecture 80 and output a set of segmentation masks $S_{t \to i}$ with values bounded between (0,1) by using a sigmoid activation function. When the value of the segmentation mask is close to 1, the corresponding target pixel should be present in the source image with the same intensity and should belong to a static object. The SLAM-Net engine 70 may then improve the loss in Equation 3:

$$\mathcal{L}_{ph}=\Sigma_i\Sigma_p S_{t \to i}(p)|I(p)-I(p_i)|. \quad (6)$$

This loss has a technical problem of the degenerate solution of the segmentation mask only outputting zeros. A solution to this is further discussed herein with respect to Unsupervised Depth Prior Learning.

The SLAM-Net engine 70 does not update Equation 4 to account for the segmentation mask because the $\mathcal{L}_{cl}$ term has a larger weight at early training times. When the network is starting to learn, there may be a larger confidence in the point tracking method than in the segmentation masks that are being outputted. Moreover, in later training stages $\lambda_{cl} \to 0$ and has a low contribution to the final loss value.

Unsupervised Depth Prior Learning. The world's geometry is usually contextual and predictable. For instance, walls, floors, and ceilings are planar, while other structures, such as underwater pipelines, are long and cylindrical. The way light reflects on a surface also offers information about the shape of an object and, even the movement of some objects in a scene might provide clues about other objects, such as the movement of a car providing information about the slope of the street.

However, existing systems and methods struggle to capture all this contextual information. As noted previously, photometric error cannot deal with moving objects nor non-Lambertian surfaces. Further, photometric error struggles with textureless areas. According to some embodiments of the invention, the SLAM-Net engine 70 is an extension of the system to learn a shape prior from depth maps. These depth maps should depict scenes similar to the ones where the system is expected to be deployed and can be obtained with sensors (e.g., light detection and ranging (LIDAR), structured light, detection and ranging, etc.) or with simulated data.

The SLAM-Net engine 70 is an improvement over existing systems and methods, which may employ a smoothness prior on the estimated depth maps by minimizing the L1 norm of the second order gradients. This encourages the depth map values to change smoothly which is not optimal near object boundaries.

Figure 9:
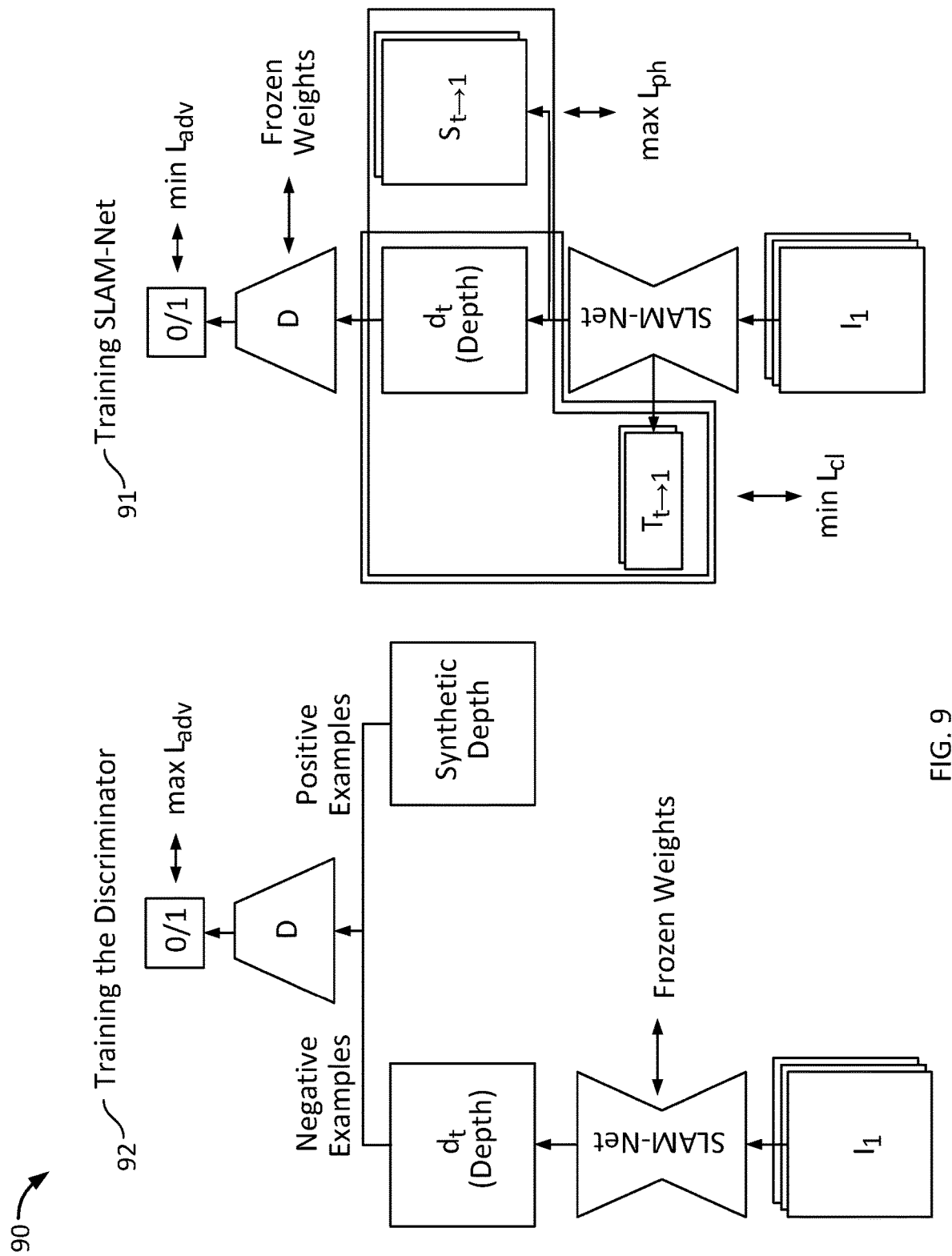
FIG. 9 depicts a GAN, according to some embodiments.

General Adversarial Networks (GANs). FIG. 9 depicts a GAN 90, according to some embodiments including a generator network 91 and a discriminator network 92. The SLAM-Net engine 70 may use GANs to learn a depth prior and use it to improve the estimated depth maps. GANs are composed of two distinct neural networks that are trained jointly: 1) a generator network (like generator network 91) that produces fake examples, and 2) a discriminator network (like discriminator network 92) that distinguishes between fake and real examples. The discriminator network 92 may be a binary classifier that is trained with examples coming from the generator network 91 and real examples. The generator network 91, on the other hand, is trained to maximize the misclassification of the discriminator network 92. As the training starts, the generator network 91 may output examples that are easy to distinguish from real ones and, therefore, the task of the discriminator network 92 is easy. As the training proceeds, the generator network 91 starts producing more realistic examples and the discriminator network's 92 accuracy should tend to random chance.

Shape Prior. In some embodiments, the network that outputs the depth map is the generator network 91. Then, the SLAM-Net engine 70 can add the extra goal of outputting depth maps similar to real or synthetic depth map examples. For that, the SLAM-Net engine 70 requires a new neural network to perform the role of the depth discriminator network D that outputs a value bounded between (0,1) by using a sigmoid activation function in the last layer. The adversarial loss thus becomes:

$$\mathcal{L}_{adv}=E_{r \sim p_{depth}(r)}[\log D(r)]+E_{l \sim p_{data}(l)}[\log(1-D(d_t))], \quad (7)$$

where r is a real or synthetic depth map sampled from the training dataset and $d_t$ is the depth map of the target frame. The depth discriminator network D is trained to maximize $\mathcal{L}_{adv}$ while the generator network (the network that outputs $d_t$) is trained to minimize $\mathcal{L}_{adv}$.

With this loss, points that are excluded from the loss in Equation 6 by all segmentation masks $S_{t \to i}$ are still required to output a meaningful depth value. Such points might belong, for instance, to moving objects. Further, areas that have low visibility might still output valid depth maps due to context. For example, an underwater pipeline has a predictable cylindrical shape that might still be captured by the generator network, even in the presence of debris or noise.

The loss that the SLAM-Net engine 70 is trained to minimize is then:

$$\mathcal{L} = \mathcal{L}_{ph} + \lambda_{cl}\mathcal{L}_{cl} + \lambda_{adv}\mathcal{L}_{adv}, \quad (8)$$

Where $\lambda_{adv}$ is the weight given to the adversarial loss. The SLAM-Net engine 70 may train the discriminator network (e.g., discriminator network 91) and the generator network (e.g., generator network 91 or SLAM-NET as depicted in FIG. 9) in turns. Thus, when SLAM-Net is being trained, the discriminator network's weights are frozen and vice versa. At each step, the SLAM-Net engine 70 may sample a small batch of examples so none of the networks are overtrained.

FIG. 9 shows an overview of the two-step training process of the system and what variables may be used for the computation of each loss term. The weights of SLAM-Net are not updated while training the discriminator network. In some embodiments, SLAM-Net is used to generate a set of depth maps to be fed to the discriminator network as negative examples while synthetic depth maps are used as positive examples. In some embodiments, the discriminator network's weights are fixed while training SLAM-Net.

Synthetic Data. Sensors, such as structured light sensors, are capable of obtaining a scene's depth maps. However, these sensors may be prone to errors in reflective and transparent surfaces and, therefore, synthetic depth maps are a promising alternative.

As long as the SLAM-Net engine 70 has an accurate 3D model depiction of a real scene, the SLAM-Net engine 70 may obtain better depth maps by synthesizing them than by using structure-light sensors or LIDAR. Moreover, the SLAM-Net engine 70 can synthesize depth maps from arbitrarily many viewpoints. This is desirable because deep learning methods require large amounts of data to work properly.

Optional Supervision

According to some embodiments, although disclosed systems and methods are able to learn in a fully unsupervised manner, it is still possible to provide supervision when ground-truth data is available. This additional supervision may help improve results and reduce the amounts of data needed.

Depth. As previously discussed, the SLAM-Net engine 70 may obtain data with depth ground-truth when there is access to additional equipment such as structured-light sensors. Even though these depth maps may be imperfect, they can help in improving the results of the SLAM-Net engine 70. When depth ground-truth data is available, the SLAM-Net engine 70 may be trained to minimize the following loss term:

$$\mathcal{L}_{depth} = |d_t - d^{GT}| \quad (9)$$

Motion. The SLAM-Net engine 70 may provide supervision when motion ground-truth is available. In some embodiments, the SLAM-Net engine 70 can minimize the translation and angle errors L1 norm:

$$\mathcal{L}_t = \sum_i |t_{t \to i} - t_{t \to i}^{GT}| \quad (11)$$

$$\mathcal{L}_{rot} = \sum_i \sum_a^{\alpha,\beta,\gamma} |\sin a_{t \to i} - \sin a_{t \to i}^{GT}|.$$

Segmentation Mask. The segmentation masks may be used to remove pixels that do not follow the model's assumptions from the photometric error computation. In some embodiments, ground-truth data may be available for such pixels. For instance, if a fish has moved between the target and a given source frame, the segmentation mask should output zeroes in the pixels belonging to the fish.

In most cases, ground-truth data may only be available for a subset of the image's pixels. Thus, the SLAM-Net engine 70 may minimize the following loss:

$$\mathcal{L}_s = -\sum_i^M S_i^M (S_{t \to i}^{GT}\log(S_{t \to i}) + (1 - S_{t \to i}^{GT})\log(1 - S_{t \to i}))$$

where $S_i^M$ is a binary mask that signals the presence or absence of ground-truth segmentation mask values for the $i^{th}$ source frame.

Single Frame Depth. One of the disadvantages and technical problems of the model, as explained previously, is that it is not able to perform a single-frame depth estimation. However, the SLAM-Net engine 70 can input the same frame N times. In this particular case, the SLAM-Net engine 70 knows at least two things: 1) the camera did not move; and 2) all the pixels respect Equation 3. Therefore, the SLAM-Net engine 70 can train the model using camera motion supervision for zero translation and rotation and, following the insight that all pixels respect Equation 3, the SLAM-Net engine 70 may apply supervision on the segmentation masks to be equal to 1 in all pixels. Because the SLAM-Net engine 70 is also minimizing the adversarial loss, the outputted depth map is required to be valid.

Inference Optimization

According to some embodiments, for the systems and methods to work at inference time, objects that follow the Static world assumption are still required to be displayed in the video. However, some environments lack such features. For instance, underwater videos might display nothing more than moving fish, while videos taken from an aerial vehicle might only show moving clouds.

With respect to the underwater example, even if the model is able to correctly output a depth map for the fish at the target frame, it may be difficult or impossible to get a precise estimation of the camera motion unless other variables are known, such as the current velocity. Further, in cases where not even a single fish is visible in the video, the task of estimating camera motion from video alone may become impossible.

Moreover, depth maps' precision drops when objects are far from the camera. In cases where all pixels are far from the camera (e.g., in an underwater scenario where there are no visible objects), the SLAM-Net engine 70 cannot be confident in both the estimated depth map and camera motion. Therefore, when a sufficient percentage of pixels is farther from the camera than a distance threshold, the SLAM-Net engine 70 may disregard the estimated camera motions. In some embodiments, if 90% of the pixels are farther than 100 meters, the camera motions are disregarded. However, both the distance threshold and the percentage of pixels may vary from use-case to use-case.

Sensor Fusion. Another technical problem exists when estimated camera motions are disregarded because the SLAM-Net engine 70 must determine its restarting position when the system recovers and starts outputting camera motion estimates again. To solve this problem, the SLAM-Net engine 70 may use existing sensors, such as positional sensors, GPS sensors, ultra-short baseline (USBL) sensors, or other sensors, depending on the application.

These sensors may provide the system with a drift-free position estimation, albeit with low precision. This drift-free position estimation with low precision contrasts with typical simultaneous localization and mapping techniques, which usually have low camera motion error over small sequences but start accumulating the error and drift over time. Therefore, by fusing both outputs, the benefits of both techniques can be gained: a SLAM-Net with no positional drift and with high precision.

The SLAM-Net engine 70 may use a sensor fusion technique that can: 1) deal with missing measurements, and 2) deal with sensors producing data at different rates. The first part solves the issue of not estimating the camera motion. The second part solves the issue of the frame rate being different from the positional sensor update rate. In some embodiments, the Kalman filter and its variants may be used. In some embodiments, loop closure methods do not need to be applied because the positional sensor does not have any positional drift.

Thus, there has been shown and described a system and method of operation for ROVs using simultaneous localization and mapping. The method and system are not limited to any particular hardware or software configuration. The many variations, modifications and alternative applications of the invention that would be apparent to those skilled in the art, and that do not depart from the scope of the invention are deemed to be covered by the invention.

What is claimed is:

1. A system for operating a remotely operated vehicle (ROV) using simultaneous localization and mapping (SLAM) comprising:
    a ROV with (i) a video camera operable to output real video and (ii) a positional sensor operable to output position data;
    a SLAM engine comprising:
        a video dataset operable to store video data and real images coming from the ROV;
        a depth dataset operable to store depth maps, wherein the depth maps are each a two-dimensional matrix with the same size as the width and height of a target frame from the video camera, wherein each element of the two-dimensional matrix represents a distance from the video camera to a scene structure;
        a 3D model dataset operable to store 3D model data of a scene where an ROV may operate;
        a depth map simulator with access to the 3D model dataset and a set of camera parameters, wherein the depth map simulator is operable to synthesize a depth map for storage in the depth dataset;
        a model's weights dataset operable to store weights of the SLAM engine;
        a SLAM trainer module with access to the video dataset and the depth dataset, wherein the SLAM trainer module is operable to run a SLAM-Net architecture; and
        an application module communicatively coupled to the ROV and operable to receive the real video, the position data, and the model's weights dataset, wherein the application module is operable to smooth the position data, reconstruct the scene, and display the scene on a graphical user interface.

2. The system of claim 1, wherein the SLAM-Net architecture comprises a set of input frames.

3. The system of claim 1, wherein the SLAM-Net architecture comprises a depth map, a set of camera motions represented as transformation matrices, segmentation masks, and a plurality of convolutional neural networks.

4. The system of claim 3, wherein the SLAM-Net architecture comprises at least one skip connection.

5. The system of claim 1, further comprising:
    a set of unlabeled videos stored in the video dataset;
    wherein the SLAM engine receives the set of unlabeled videos from the video dataset and minimizes photometric error between a target frame and a set of remaining frames.

6. A system of claim 1, wherein the SLAM engine segments a plurality of pixels from the video data.

7. The system of claim 1, wherein the SLAM engine is operable to perform bilinear sampling by linearly interpolating an intensity value of four discrete pixel neighbors of a homogeneous pixel coordinate projection.

8. The system of claim 7, wherein the SLAM engine tracks at least one point across a plurality of frames.

9. The system of claim 8, wherein the SLAM engine uses a GAN to learn a depth prior to improve a depth map.

10. The system of claim 9, wherein the GAN comprises a generator network operable to output at least one fake example and a discriminator network operable to distinguish between the at least one fake example and a real example.

11. The system of claim 10, wherein the SLAM engine synthesizes depth maps using a 3D model depiction of a real scene.

12. A system for undersea exploration comprising:
    a networked operating system comprising a computer and computer executable software comprising a simultaneous localization and mapping (SLAM) engine;
    a ROV communicatively coupled with the operating system and comprising (i) a video camera operable to output real video and (ii) a positional sensor operable to output position data;
    wherein the SLAM engine comprises:
    a video dataset operable to store video data and real images coming from the ROV;
    a depth dataset operable to store depth maps, wherein the depth maps are each a two-dimensional matrix with the same size as the width and height of a target frame from the video camera, wherein each element of the two-dimensional matrix represents a distance from the video camera to a scene structure;
    a 3D model dataset operable to store 3D model data of a scene where an ROV may operate;
    a depth map simulator with access to the 3D model dataset and a set of camera parameters, wherein the depth map simulator is operable to synthesize a depth map for storage in the depth dataset;
    a model's weights dataset operable to store weights of the SLAM engine;

a SLAM trainer module with access to the video dataset and the depth dataset, wherein the SLAM trainer module is operable to run a SLAM-Net architecture;

an application module communicatively coupled to the ROV and operable to receive the real video, the position data, and the model's weights dataset, wherein the application module is operable to smooth the position data and reconstruct the scene; and a navigation interface configured to display the scene, the navigation interface comprising at least one networked monitor.

13. The system of claim 12, wherein the SLAM-Net architecture comprises a set of input frames.

14. The system of claim 13, wherein the SLAM-Net architecture comprises a depth map, a set of camera motions represented as transformation matrices, segmentation masks, and a plurality of convolutional neural networks.

15. The system of claim 14, further comprising:
a set of unlabeled videos stored in the video dataset;
wherein the SLAM engine receives the set of unlabeled videos from the video dataset and minimizes photometric error between a target frame and a set of remaining frames.

16. The system of claim 15, wherein the SLAM engine segments a plurality of pixels from the video data.

17. The system of claim 16, wherein the SLAM engine is operable to perform bilinear sampling by linearly interpolating an intensity value of four discrete pixel neighbors of a homogeneous pixel coordinate projection.

18. The system of claim 17, wherein the SLAM engine tracks at least one point across a plurality of frames.

19. The system of claim 18, wherein the SLAM engine uses a GAN to learn a depth prior to improve a depth map; and wherein the GAN comprises a generator network operable to output at least one fake example and a discriminator network operable to distinguish between the at least one fake example and a real example.

20. A method of simultaneous localization and mapping (SLAM) for a remotely operated vehicle (ROV) comprising:
obtaining, from the ROV, video data from a video camera, real images, and position data;
obtaining depth maps, wherein the depth maps are each a two-dimensional matrix with the same size as the width and height of a target frame from the video camera, wherein each element of the two-dimensional matrix represents a distance from the video camera to a scene structure;
smoothing the position data using a SLAM-Net convolutional neural network (CNN) architecture and outputting smoothed position data;
reconstructing a 3D scene based at least in part on the smoothed position data; and
displaying the 3D scene on a graphical user interface.

* * * * *